United States Patent
Lee et al.

(10) Patent No.: US 9,606,916 B2
(45) Date of Patent: Mar. 28, 2017

(54) SEMICONDUCTOR DEVICES INCLUDING APPLICATION PROCESSOR CONNECTED TO HIGH-BANDWIDTH MEMORY AND LOW-BANDWIDTH MEMORY, AND CHANNEL INTERLEAVING METHOD THEREOF

(71) Applicant: Samsung Electronics Co., Ltd., Suwon-si (KR)

(72) Inventors: Sung Hyun Lee, Gwangju-si (KR); Jun Hee Yoo, Ansan-si (KR); Dongsoo Kang, Hwaseong-si (KR); Il Park, Hwaseong-si (KR); Kiyeon Lee, Yongin-si (KR); Euicheol Lim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 149 days.

(21) Appl. No.: 14/307,994

(22) Filed: Jun. 18, 2014

(65) Prior Publication Data
US 2015/0081989 A1    Mar. 19, 2015

Related U.S. Application Data

(60) Provisional application No. 61/877,478, filed on Sep. 13, 2013, provisional application No. 61/898,074, filed on Oct. 31, 2013.

(51) Int. Cl.
G06F 12/06 (2006.01)

(52) U.S. Cl.
CPC ...... *G06F 12/0607* (2013.01); *Y02B 60/1225* (2013.01)

(58) Field of Classification Search
CPC .............. G06F 9/3895; G06F 12/0607; G06F 12/0851; G06F 13/1647; G06F 15/7857
See application file for complete search history.

(56) References Cited

U.S. PATENT DOCUMENTS

| | | |
|---|---|---|
| 6,202,133 B1 | 3/2001 | Jeddeloh |
| 6,877,076 B1 | 4/2005 | Cho et al. |
| 7,552,292 B2 | 6/2009 | Hsieh et al. |
| 7,760,726 B2 | 7/2010 | Barrack et al. |

(Continued)

FOREIGN PATENT DOCUMENTS

KR    100607939    8/2006

OTHER PUBLICATIONS

Gomony et al. "Architecture and optimal configuration of a real-time multi-channel memory controller."Design, Automation & Test in Europe Conference & Exhibition (Date), IEEE, Mar. 2013.*

*Primary Examiner* — Nicholas Simonetti
(74) *Attorney, Agent, or Firm* — Onello & Mello, LLP

(57) ABSTRACT

A memory system includes a high-bandwidth memory device, the high-bandwidth memory device having a relatively high operation bandwidth, the high-bandwidth memory device having a plurality of access channels. A low-bandwidth memory device has a relatively low operation bandwidth relative to the high-bandwidth memory device, the low-bandwidth memory device having one or more access channels. An interleaving unit performs a memory interleave operation among the plurality of access channels of the high-bandwidth memory device and an access channel of the one or more access channels of the low-bandwidth memory device.

20 Claims, 19 Drawing Sheets

(56) References Cited

U.S. PATENT DOCUMENTS

| | | |
|---|---|---|
| 8,098,539 B2 | 1/2012 | Sankuratri et al. |
| 8,122,199 B2 | 2/2012 | Kwon et al. |
| 8,438,320 B2 | 5/2013 | Srinivasan et al. |
| 8,589,650 B2 | 11/2013 | Yokoya et al. |
| 2004/0268030 A1* | 12/2004 | Cheung ......................... 711/105 |
| 2006/0271823 A1* | 11/2006 | Smith ............................. 714/37 |
| 2008/0150116 A1* | 6/2008 | Jang et al. .................... 257/686 |
| 2011/0055617 A1* | 3/2011 | Sankuratri et al. ........... 713/600 |
| 2011/0309468 A1* | 12/2011 | Oh et al. ....................... 257/508 |
| 2012/0155160 A1* | 6/2012 | Alam et al. .......... G11C 7/1042 365/158 |
| 2012/0311371 A1 | 12/2012 | Shaeffer |
| 2014/0164690 A1* | 6/2014 | De et al. ....................... 711/105 |

* cited by examiner

<PoP>

SEMICONDUCTOR DEVICES INCLUDING APPLICATION PROCESSOR CONNECTED TO HIGH-BANDWIDTH MEMORY AND LOW-BANDWIDTH MEMORY, AND CHANNEL INTERLEAVING METHOD THEREOF

CROSS-REFERENCE TO RELATED APPLICATIONS

This U.S. non-provisional patent application claims benefit under 35 U.S.C. §119 of U.S. Provisional Patent Application 61/877,478, filed Sep. 13, 2013, and U.S. Provisional Patent Application 61/898,074, filed Oct. 31, 2013, the entire content of each being incorporated by reference herein.

BACKGROUND

The present inventive concepts herein relate to semiconductor devices, and more particularly, to semiconductor devices including a plurality of different types of memory devices having different bandwidths relative to one another, and to a channel interleaving method thereof.

Semiconductor devices can often times include an application processor (AP), which, in some cases, is embodied in a system on chip (SoC). For example, a mobile system may commonly include a modem and an application processor (AP) or a multimedia processor. Contemporary semiconductor-based electronic systems can require one or more memory devices to support processor operation.

Semiconductor devices can perform interleaving operations among multiple memory devices, i.e. two or more devices, for memory access. That is, a semiconductor device can alternately access two or more memory devices. When this operation is performed, the memory devices are typically of the same type, for example, both of the DRAM type of memory devices. In some cases, a semiconductor device can utilize different types of memory devices. For example, a first memory device can have a relatively high-speed data transmission rate but may be of relatively small memory size and a second memory device can have a relatively low-speed data transmission rate but may be of relatively large memory size.

SUMMARY

In an aspect, a memory system comprises: a high-bandwidth memory device, the high-bandwidth memory device having a relatively high operation bandwidth, the high-bandwidth memory device having a plurality of access channels; a low-bandwidth memory device, the low-bandwidth memory device having a relatively low operation bandwidth relative to the high-bandwidth memory device, the low-bandwidth memory device having one or more access channels; and an interleaving unit that performs a memory interleave operation among the plurality of access channels of the high-bandwidth memory device and an access channel of the one or more access channels of the low-bandwidth memory device.

In some embodiments, the interleaving unit comprises a memory controller in communication with the high-bandwidth memory device and the low-bandwidth memory device.

In some embodiments, the one or more access channels of the low-bandwidth memory device comprises a plurality of access channels and wherein the interleaving unit performs a memory interleave operation among the plurality of access channels of the high-bandwidth memory device and the plurality of access channels of the low-bandwidth memory device.

In some embodiments, the interleaving unit comprises a high-bandwidth channel interleaving unit that manages the memory interleave operation among the plurality of access channels of the high bandwidth memory device.

In some embodiments, the interleaving unit further comprises a low-bandwidth channel interleaving unit that manages the memory interleave operation among the plurality of access channels of only the low-bandwidth memory device.

In some embodiments, the memory system further comprises a router that selects a mode of operation of the memory system among at least one of: an interleave operation among the plurality of access channels of the high-bandwidth memory device; an interleave operation among multiple ones of the one or more access channels of the low-bandwidth memory device; and an interleave operation among the plurality of access channels of the high-bandwidth memory and the at least one of the one or more access channels of the low-bandwidth memory device.

In some embodiments, the memory system further comprises a multiplexer that selects the at least one of the one or more access channels of the low-bandwidth memory device for the interleave operation.

In some embodiments, the interleaving unit comprises: a high-bandwidth channel interleaving unit that manages the memory interleave operation among the plurality of access channels of the high bandwidth memory device; and a low-bandwidth channel interleaving unit that manages the memory interleave operation among the plurality of access channels of only the low-bandwidth memory device; and wherein the multiplexer receives a selection signal from at least one of the high-bandwidth channel interleaving unit, the low-bandwidth channel interleaving unit, and the router.

In some embodiments, the low-bandwidth memory device comprises multiple low-bandwidth memory devices, each low-bandwidth memory device having at least one access channel, and wherein the memory interleave operation is performed among the plurality of access channels of the high-bandwidth memory device and the at least one access channels of the multiple low-bandwidth memory devices.

In some embodiments, the high-bandwidth memory device comprises a Wide I/O memory device; and the low-bandwidth memory device comprises a Low-Power DDR (LPDDR) memory device.

In some embodiments, during a low-power mode of operation of the system, the interleaving unit performs a memory interleave operation only among the one or more access channels of the LPDDR memory device.

In some embodiments, the access channels of the high-bandwidth memory device and the low bandwidth memory device among which the interleave operation is performed comprise assigned segments of memory that have a same memory size and have a same access rate.

In some embodiments, the high-bandwidth memory device is fabricated on a first chip and wherein an application processor including the interleaving unit is fabricated on a second chip and wherein the first chip and the second chip are connected to one another using a through-silicon via connection arrangement.

In some embodiments, the first chip and second chip are mounted to a first printed circuit board and packaged collectively in a first chip package; the low-bandwidth memory device is fabricated on a third chip mounted to a printed circuit board, wherein the third chip is connected to the printed circuit board by a wiring arrangement, and wherein the third chip and second printed circuit board are packaged collectively in a second package; and the first chip package and second chip package are connected to each other by a wiring arrangement.

In an aspect, a system on a chip comprises a memory controller; a high-bandwidth memory device in communication with the memory controller, the high-bandwidth memory device having a relatively high operation bandwidth, the high-bandwidth memory device having a plurality of access channels, the high-bandwidth memory device comprising a WideIO type memory device; a low-bandwidth memory device in communication with the memory controller, the low-bandwidth memory device having a relatively low operation bandwidth, relative to the high-bandwidth memory device, the low-bandwidth memory device having one or more access channels, the low-bandwidth device comprising a Low-Power DDR type memory device; and an interleaving unit that performs a memory interleave operation among the plurality of access channels of the high-bandwidth memory device and an access channel of the one or more access channels of the low-bandwidth memory device.

In some embodiments, the system on a chip further comprises: a first chip on which the memory controller is fabricated; at least one second chip on which at least one corresponding high-bandwidth memory devices is fabricated; wherein the at least one second chip is stacked on the first chip.

In some embodiments, the at least one second chip is connected to the first chip using a through-silicon via connection arrangement.

In some embodiments, the at least one second chip on which at least one corresponding high-bandwidth memory devices is fabricated comprises multiple second chips including multiple high-bandwidth memory devices.

In some embodiments, the Low-Power DDR type memory device comprises at least one of a LPDDR1, LPDDR2, LPDDR3, LPDDR4, or LPDDR5 generation device.

In some embodiments, during a low-power mode of operation of the system, the interleaving unit performs a memory interleave operation only among the one or more access channels of the LPDDR memory device.

In some embodiments, the access channels of the high-bandwidth memory device and the low bandwidth memory device among which the interleave operation is performed comprise assigned segments of memory that have a same memory size and have a same access rate.

In another aspect, a channel interleaving unit for a memory system comprises: a high-bandwidth channel interleaver that performs a memory interleave operation among a plurality of access channels of a high-bandwidth memory device; a low-bandwidth channel interleaver that performs a memory interleave operation among a plurality of access channels of a low-bandwidth memory device; and a router that, in response to a memory access command, controls operation of the high-bandwidth channel interleaver and the low-bandwidth channel interleaver to initiate an interleave operation among the plurality of access channels of the high-bandwidth memory device and an access channel of the one or more access channels of the low-bandwidth memory device.

In some embodiments, the high-bandwidth memory device has a relatively high operation bandwidth, wherein the low-bandwidth memory device has a relatively low operation bandwidth, relative to the high-bandwidth memory device.

In some embodiments, the high-bandwidth memory device comprises a Wide I/O memory device; and wherein the low-bandwidth memory device comprises a Low-Power DDR (LPDDR) memory device.

In some embodiments, the router further selects a mode of operation of among at least one of: an interleave operation among the plurality of access channels of the high-bandwidth memory device; an interleave operation among multiple ones of the one or more access channels of the low-bandwidth memory device; and an interleave operation among the plurality of access channels of the high-bandwidth memory and the at least one of the one or more access channels of the low-bandwidth memory device.

In some embodiments, the channel interleaving unit further comprises a multiplexer that selects the at least one of the one or more access channels of the low-bandwidth memory device for the interleave operation.

In an aspect, a method of performing an interleaving operation in a memory system, comprises: partitioning a high-bandwidth memory device into a plurality of first segments, the first segments having a same access size and a same access rate, the high-bandwidth memory device having a relatively high operation bandwidth, the high-bandwidth memory device having a plurality of first access channels, each first access channel corresponding to one of the first segments; partitioning a low-bandwidth memory device into a plurality of second segments, the second segments having a same access size and a same access rate as each other, the low-bandwidth memory device having a relatively low operation bandwidth, relative to the high-bandwidth memory device; the low-bandwidth memory device having a plurality of second access channels, each second access channel corresponding to one of the second segments; and performing a memory interleave operation among the plurality of first access channels of the high-bandwidth memory device and at least one second access channel of the plurality of access channels of the low-bandwidth memory device.

In some embodiments, the high-bandwidth memory device comprises a Wide I/O memory device; and wherein the low-bandwidth memory device comprises a Low-Power DDR (LPDDR) memory device.

In some embodiments, the second segments have a same access size and a same access rate as those of the first segments, In some embodiments, the low-bandwidth memory device has an available access size and wherein the combined access sizes of the second segments is less than the available access size.

In some embodiments, during a low-power mode of operation of the system, the interleave operation is performed only among the one or more access channels of the low-bandwidth memory device.

In some embodiments, during a low-power mode of operation of the system, the interleave operation is performed only among the one or more access channels of the high-bandwidth memory device.

In some embodiments, the interleave operation is performed among the plurality of first access channels of the high-bandwidth memory device and at least one second access channel of the plurality of access channels of the low-bandwidth memory device, during a high-power mode of operation of the system.

In an aspect, a method of performing an interleaving operation in a memory system including a high-bandwidth memory device and a low-bandwidth memory device, comprises: receiving a request for a memory access operation; determining whether an available memory region of the high-bandwidth memory is sufficient for processing the request; assigning a channel identification in response to the request; and if the available memory region of the high-bandwidth memory is insufficient for processing the request, performing a channel interleaving operation in response to the channel identification among a plurality of access channels of the high-bandwidth memory device and an access channel of one or more access channels of the low-bandwidth memory device.

In some embodiments, the memory access operation is a write operation

In some embodiments, the memory access operation is a read operation

In an aspect, a mobile device comprises: a memory system comprises: a high-bandwidth memory device, the high-bandwidth memory device having a relatively high operation bandwidth, the high-bandwidth memory device having a plurality of access channels; a low-bandwidth memory device, the low-bandwidth memory device having a relatively low operation bandwidth relative to the high-bandwidth memory device, the low-bandwidth memory device having one or more access channels; and an interleaving unit that performs a memory interleave operation among the plurality of access channels of the high-bandwidth memory device and an access channel of the one or more access channels of the low-bandwidth memory device. an input device at which a user provides user input to the memory system; and a display that provides information output by the memory system.

In some embodiments, the mobile device further comprises a mobile power source.

In some embodiments, the mobile device comprises a system-on-a-chip.

In an aspect, a system on chip (SoC) comprises: a high-bandwidth memory device having a plurality of access channels; a first low-bandwidth memory device having one or more access channels, the high-bandwidth memory device having a higher operation bandwidth than the first low-bandwidth memory device; and an interleaving unit configured to perform a memory interleave operation among the plurality of access channels of the high-bandwidth memory device and at least one of the one or more access channels of the first low-bandwidth memory device.

In some embodiments, the interleaving unit comprises a memory controller in communication with the high-bandwidth memory device and the first low-bandwidth memory device.

In some embodiments, the first low-bandwidth memory device comprises a plurality of access channels, and the interleaving unit performs a memory interleave operation among the plurality of access channels of the high-bandwidth memory device and the plurality of access channels of the first low-bandwidth memory device.

In some embodiments, the interleaving unit comprises a high-bandwidth channel interleaver configured to manage the memory interleave operation among the plurality of access channels of the high-bandwidth memory device and the at least one of the one or more access channels of the first low-bandwidth memory device.

In some embodiments, the interleaving unit further comprises a low-bandwidth channel interleaver configured to manage the memory interleave operation among the remaining access channels of the first low-bandwidth memory device other than the at least one access channel of the first low-bandwidth memory device managed by the high-bandwidth channel interleaver.

In some embodiments, the interleaving unit performs a mode of operation of the SoC among one of: an interleave operation among the plurality of access channels of the high-bandwidth memory device; an interleave operation among the one or more access channels of the first low-bandwidth memory device; and an interleave operation among the plurality of access channels of the high-bandwidth memory and the at least one of the one or more access channels of the first low-bandwidth memory device.

In some embodiments, the SoC further comprises a second low-bandwidth memory device, wherein the second low-bandwidth memory device includes one or more access channels, and the memory interleave operation is performed among the plurality of access channels of the high-bandwidth memory device, the at least one of one or more access channels of the first low-bandwidth memory device, and at least one of the one or more access channels of the second low-bandwidth memory device.

In some embodiments, the high-bandwidth memory device comprises a Wide I/O memory device; and the low-bandwidth memory device comprises a Low-Power DDR (LPDDR) memory device.

In some embodiments, during a low-power mode of operation of the SoC, the interleaving unit performs the memory interleave operation among the plurality of access channels of the Wide I/O memory device.

In some embodiments, during a high-power mode of operation of the SoC, the interleaving unit performs the memory interleave operation among the plurality of access channels of the Wide I/O memory device and the at least one of the one or more access channels of the LPDDR memory device.

In some embodiments, a bandwidth of the high-bandwidth memory device is evenly divided by the number of access channels of the high-bandwidth memory device, and the high-bandwidth memory device performs data communication via each access channel with the evenly divided bandwidth.

In some embodiments, a bandwidth of the low-bandwidth memory device is evenly divided by the number of access channels of the low-bandwidth memory device, and when the evenly divided bandwidth of the low-bandwidth memory device is less than the evenly divided bandwidth of the high-bandwidth memory device, the interleaving unit performs a portion of a memory access command using at least two access channels of the low-bandwidth memory device.

In some embodiments, the high-bandwidth memory device is fabricated on a first chip, an application processor including the interleaving unit is fabricated on a second chip, and the first chip and the second chip are connected to one another using a through-silicon via connection arrangement.

In some embodiments, the first chip and second chip are mounted to a first printed circuit board and packaged collectively in a first chip package, the low-bandwidth memory device is fabricated on a third chip mounted to a second printed circuit board, the third chip is connected to the second printed circuit board by a wiring arrangement, the third chip and the second printed circuit board are packaged collectively in a second package; and the first chip package and the second chip package are connected to each other by a wiring arrangement.

In an aspect, a system on chip (SoC) comprises: a memory controller; a high-bandwidth memory device in communication with the memory controller, the high-bandwidth memory device having a plurality of access channels, the high-bandwidth memory device comprising a Wide I/O type memory device; a low-bandwidth memory device in communication with the memory controller, the low-bandwidth memory device having one or more access channels, the low-bandwidth device comprising a Low-Power DDR type memory device, the high-bandwidth memory device having a higher operation bandwidth than the first low-bandwidth memory device; and an interleaving unit configured to perform a memory interleave operation among the plurality of access channels of the high-bandwidth memory device and at least one of the one or more access channels of the low-bandwidth memory device.

In some embodiments, the SoC further comprises: a first chip on which the memory controller is fabricated; and at least one second chip on which the high-bandwidth memory device is fabricated, wherein the at least one second chip is stacked on the first chip.

In some embodiments, the at least one second chip comprises a plurality of second chips, each of the plurality of second chips including one or more Wide I/O type memory devices.

In an aspect, a channel interleaving unit for a system on chip (SoC) comprises: a high-bandwidth channel interleaver configured to perform a memory interleave operation among a plurality of access channels of a high-bandwidth memory device and at least one of one or more access channels of a low-bandwidth memory device; a low-bandwidth channel interleaver configured to perform the memory interleave operation among at least one access channel of the low-bandwidth memory device; and a router configured to receive memory access commands and determine whether each of the memory access commands is transmitted to the high-bandwidth channel interleaver or to the low-bandwidth channel interleaver based on an address of each of the memory access commands.

In some embodiments, the channel interleaving unit further comprises a multiplexer configured to perform an arbitration among the memory access commands.

In some embodiments, the multiplexer performs the arbitration based on priority information.

In some embodiments, the priority information includes priority information of each of the memory access commands and status information of the channel interleaving unit, the status information including urgent information of the high-bandwidth channel interleaver, urgent information of the low-bandwidth channel interleaver and urgent information of the router, the urgent information being generated based on status of a buffer for storing the memory access commands.

In an aspect, a mobile device comprises: a system on chip (SoC) comprises: a high-bandwidth memory device having a plurality of access channels; a low-bandwidth memory device having one or more access channels, the high-bandwidth memory device having a higher operation bandwidth than the first low-bandwidth memory device; and an interleaving unit configured to perform a memory interleave operation among the plurality of access channels of the high-bandwidth memory device and at least one of the one or more access channels of the low-bandwidth memory device; an input device at which a user provides user input to the SoC; and a display configured to provide information output by the SoC.

BRIEF DESCRIPTION OF THE DRAWINGS

Embodiments of the inventive concepts will be described herein in more detail with reference to the accompanying drawings. The embodiments of the inventive concepts may, however, be embodied in different forms and should not be construed as limited to the embodiments set forth herein. Rather, these embodiments are provided so that this disclosure will be thorough and complete, and will convey the scope of the inventive concepts to those skilled in the art. Like numbers refer to like elements throughout.

DETAILED DESCRIPTION OF EMBODIMENTS

Figure 1:
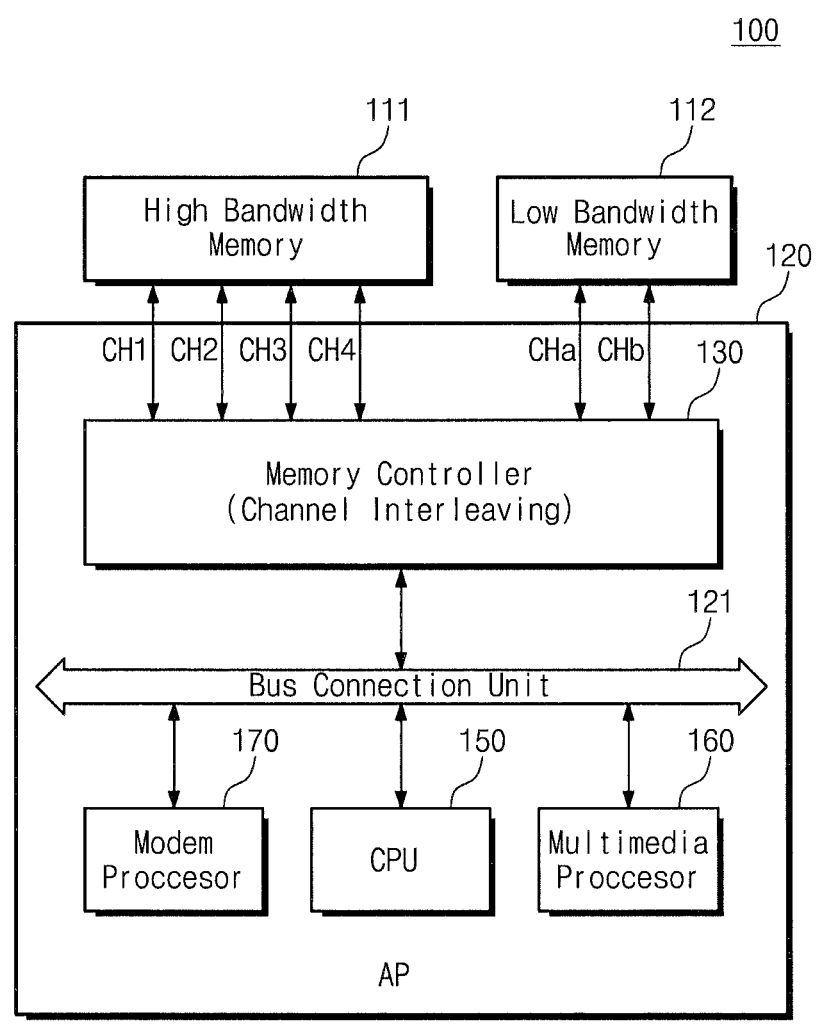
FIG. 1 is a block diagram illustrating a semiconductor device in accordance with an embodiment of the inventive concepts.

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions may be exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts may be described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Semiconductor devices in accordance with embodiments of the inventive concepts can employ a portion of a low-bandwidth memory (for example, LPDDRx type memory) as a high-bandwidth region when a memory size of the high-bandwidth memory (for example, WideIO type memory) is insufficient by performing a channel interleaving operation on different types of two or more memories that have different bandwidths relative to one another. Hereinafter, a channel interleaving operation of a semiconductor device in accordance with embodiments of the inventive concepts will be described.

FIG. 1 is a block diagram illustrating a semiconductor device in accordance with embodiments of the inventive concepts. Referring to FIG. 1, a semiconductor device 100 includes a high bandwidth memory device 111, a low bandwidth memory device 112 and an application processor (AP) 120.

In FIG. 1, the high bandwidth memory device 111 and the application processor 120 can, in some embodiments, be embodied in a system-on-a-chip (SoC) configuration. In other embodiments, the high bandwidth memory device 111, the low bandwidth memory device 112 and the application processor 120 can together be embodied in a SoC configuration.

In some embodiments, the application processor 120 can include one or more of a memory controller 130, a central processing unit (CPU) 150, a multimedia processor 160 and a modem processor 170 for accessing the high bandwidth memory device 111 and the low bandwidth memory device 112. One or more of the memory controller 130, the central processing unit (CPU) 150, the multimedia processor 160 and the modem processor 170 can be connected to, and communicate with, one another through a bus connection unit 121.

In some embodiments, the high bandwidth memory device 111 is connected to the memory controller 130 through one or more channels, and in the present example embodiment, four channels CH1~CH4. The low bandwidth memory device 112 is connected to the memory controller 130 through one or more channels, and in the present embodiment, two channels CHa and CHb. If it is assumed that one channel transmits data of 128 bits in width, the high bandwidth memory device 111 has a bandwidth that can transmit data of 512 bits and the low bandwidth memory device 112 has a bandwidth that can transmit data of 256 bits. High bandwidth memory devices and low bandwidth memory devices with other numbers of channels, and other data widths, are equally applicable to the principles of the present inventive concepts.

In the present exemplary embodiment, the memory controller 130 accesses the high bandwidth memory device 111 through the channels CH1~CH4 and accesses the low bandwidth memory device 112 through the channels CHa and CHb. In some embodiments, the central processing unit 150 controls an overall operation of the application processor 120 and can be configured to control the operation of peripheral devices like the high bandwidth memory device 111 and the low bandwidth memory device 112 including controlling the operations of read and write access from and to these devices 111, 112.

In some embodiments, the multimedia processor 160 is operable to process multimedia data and control a multimedia device such as a camera and/or a display. In some embodiments, the multimedia processor 160 is configured to access the high bandwidth memory device 111 and the low bandwidth memory device 112 that are connected to the application processor 120 using a channel interleaving operation as described herein. In this manner, the multimedia device can be controlled with access to the channels of the high bandwidth memory device 111 and the low bandwidth memory device 112 in a channel-interleaved arrangement.

In some embodiments, the modem processor 170 is configured to perform wireless communication with a base station or other communication devices. Like the multimedia processor 160, in embodiments of the present inventive concepts, the modem processor 170 can access channels of the high bandwidth memory device 111 and the low bandwidth memory device 112 in a channel interleaving arrangement.

Figure 2:
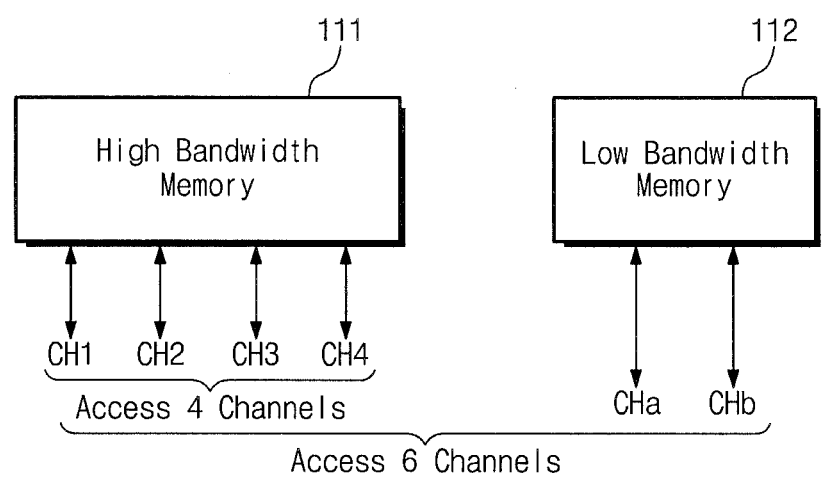
FIG. 2 is a block diagram conceptually illustrating a channel interleaving operation of the semiconductor device illustrated in FIG. 1, in accordance with an embodiment of the inventive concepts.

FIG. 2 is a block diagram conceptually illustrating a channel interleaving operation of the semiconductor device illustrated herein, in accordance with embodiments of the present inventive concepts. In some embodiments, the memory controller 130 (refer to FIG. 1) receives a memory access address ADDR and performs a channel interleaving operation on the high bandwidth memory device 111 and the low bandwidth memory device 112. In this manner, in some embodiments, the channel interleaving operation performs interleaving among at least one of high-bandwidth channels CH1~CH4 and at least one of the low-bandwidth channels CHa~CHb. In some embodiments, the channel interleaving operation performs interleaving among at least two of high-bandwidth channels CH1~CH4 and at least one of the low-bandwidth channels CHa~CHb. In some embodiments, the channel interleaving operation performs interleaving among at least two of high-bandwidth channels CH1~CH4 and at least two of the low-bandwidth channels CHa~CHb. In some embodiments, the channel interleaving operation performs interleaving among all available channels CH1~CHn of the high-bandwidth memory device and all available channels CHa~CHx of the low-bandwidth channels memory device.

The memory controller 130 can write data to the high bandwidth memory device 111 or read data from the high bandwidth memory device 111 through the first through fourth channels CH1~CH4. In general, the term "access" as used herein refers to writing data to the memory devices 111, 112, and/or reading data from the memory devices 111, 112 In some embodiments, the memory controller 130 can access the first through fourth channels CH1~CH4 of the high bandwidth memory device 111 and at least a portion of channels of the low bandwidth memory device 112. In the example embodiment of FIG. 2, the memory controller 130 accesses all the channels CHa and CHb of the low bandwidth memory device 112. However, as described herein, the memory controller 130 may optionally be configured to instead access a subset, part, or portion of the channels CHa and CHb of the low bandwidth memory device 112.

By virtue of systems and method of the present inventive concepts, the memory controller 130 can extend the memory size of the high bandwidth memory device 111, and/or can increase the bandwidth of the high bandwidth memory device 111 by utilizing at least a portion of channels of the low bandwidth memory device 112 through a channel interleaving operation. In FIG. 2, the memory controller 130 utilizes four channels of the high bandwidth memory device 111 and two channels of the low bandwidth memory device 112 to perform a channel interleaving operation among six channels of the devices, 111, 112.

In accordance with the inventive concepts, at least a portion of channels of the low bandwidth memory device 112 can be utilized by dividing a channel of the low bandwidth memory device 112 and/or by combining channels of the low-bandwidth memory device 112 to match the channel size of the high bandwidth memory device 111. In this manner, a channel interleaving operation can be performed according to the additional memory size or a bandwidth needed by the high bandwidth memory device 111. Accordingly, the semiconductor device 100 can extend a memory size of a bandwidth of the high bandwidth memory device 111 by utilizing at least a portion of the low bandwidth memory device 112 as a high bandwidth region through a channel interleaving operation.

Figure 3:
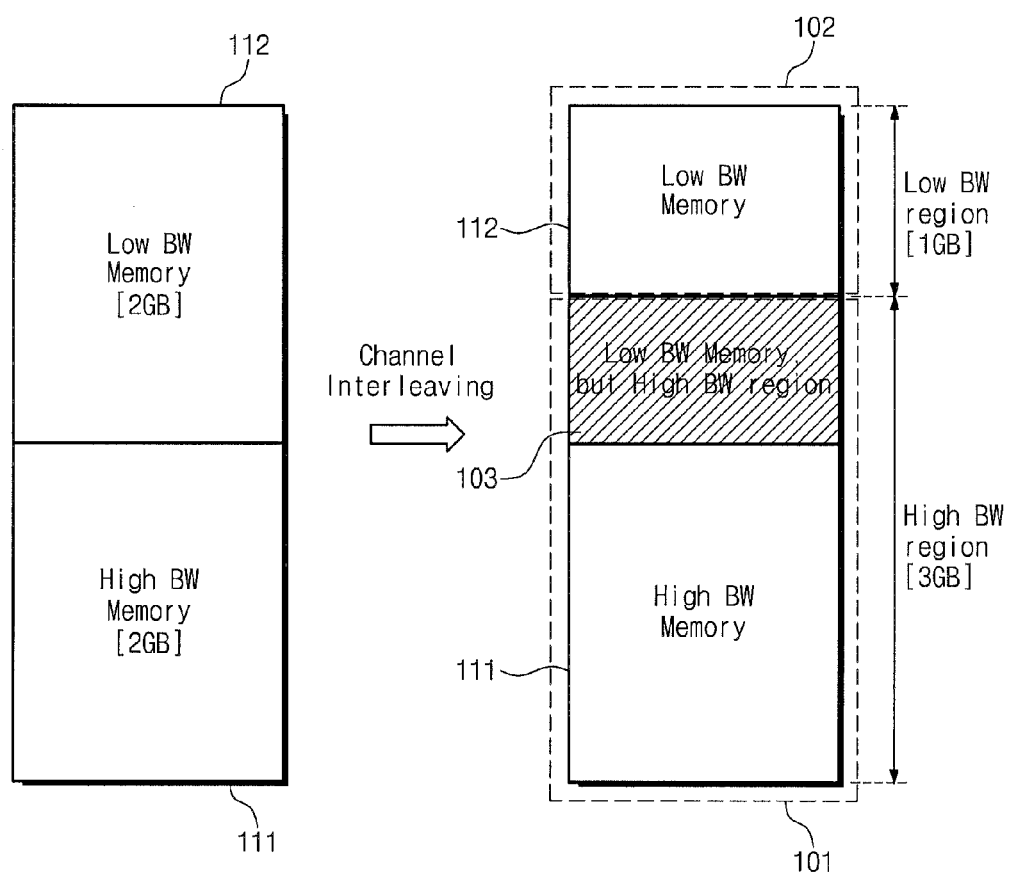
FIG. 3 is a schematic view illustrating an example of an enlarged memory size of a high bandwidth region in the semiconductor device illustrated in FIG. 1, in accordance with an embodiment of the inventive concepts.

FIG. 3 is a schematic view illustrating an example of enlarging the memory size of a high bandwidth region of the semiconductor device illustrated in FIG. 1, in accordance with the present inventive concepts.

Referring to FIG. 3, in this example, the high bandwidth memory device 111 and the low bandwidth memory device 112 are each assumed to have a memory size of 2 GB respectively.

In the semiconductor device 100, a high bandwidth region 101 can be extended to 3 GB by performing a channel interleaving operation. Accordingly, the remaining low bandwidth region 102 becomes 1 GB in size. In FIG. 3, an extension portion 103 is actually a portion of the low bandwidth memory device 112 but is used or borrowed for the high bandwidth region 101 of the overall system.

The semiconductor device 100 can use a part of extension region 103, extended from the low bandwidth memory device 112, as the high bandwidth region 101 by performing a channel interleaving operation between different kinds of memories having different bandwidths relative to one another. According to the inventive concepts, a high-bandwidth memory device with would otherwise be insufficient in size for a given application or operation can be extended by borrowing one or more segments from the low-bandwidth memory device while maintaining a high bandwidth operation characteristic of the high bandwidth memory device 111.

Figure 4:
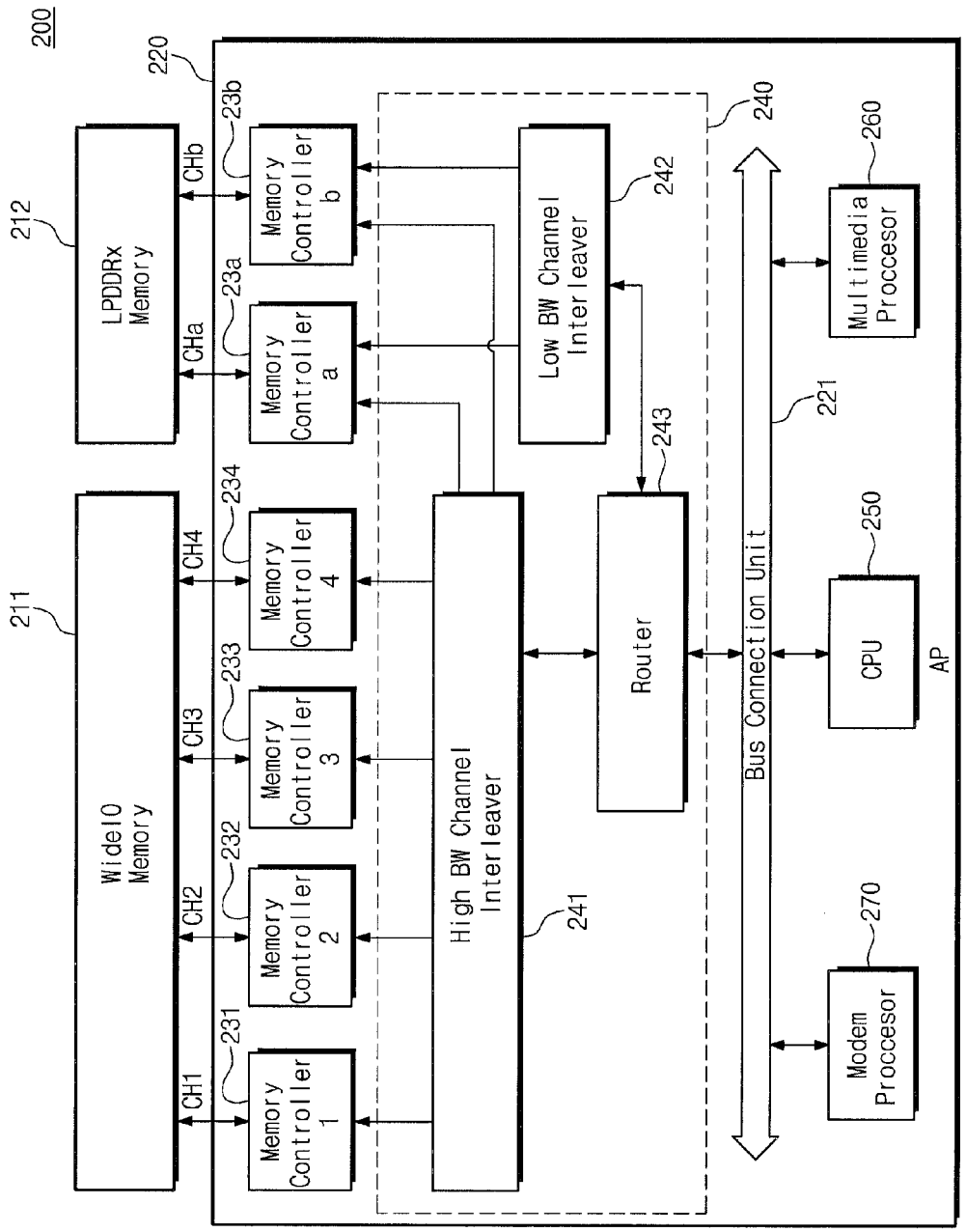
FIG. 4 is a block diagram illustrating another example of a channel interleaving operation of the semiconductor device illustrated in FIG. 1, in accordance with an embodiment of the inventive concepts.

FIG. 4 is a block diagram illustrating another example of a channel interleaving operation of semiconductor devices in accordance with the present inventive concepts. Referring to FIG. 4, a semiconductor device 200 includes a WideIO memory device 211 (operating as a high-bandwidth memory device), an LPDDRx memory device 212 (operating as a low-bandwidth memory device), and an application processor 220. In FIG. 4, the WideIO memory device 211 and the application processor can be embodied in a system-on-chip (SoC) configuration, as shown and described herein in connection with FIG. 18. In other embodiments, the WideIO memory 211, the LPDDRx memory device 212 and the application processor 220 can be embodied in a system on chip (SoC) configuration, as shown and described herein in connection with FIG. 17.

In the present example, the WideIO memory device 211 can be considered a high bandwidth memory and the LPDDRx memory device 212 can be considered a low bandwidth memory. The WideIO memory device 211 and the LPDDRx memory device 212 commonly are used as a low power memory or a mobile memory in a mobile device such as a smart phone, a tablet PC, and other mobile devices.

Over time, the LPDDRx (low power double data rate) memory 212 has been manifested as LPDDR1, LPDDR2, LPDDR3, LPDDR4, etc. devices, according to adaptations in the related JEDEC standards. The LPDDR1 device was originally designed to reduce total power consumption of a DDR SDRAM and the supply voltage of the LPDDR1 was lowered from 2.5V to 1.8V, as compared with an SDRAM. The LPDDR1 family of devices reduces power consumption by reducing the number of times refresh operations are performed relative to temperature, since it was determined that LPDDR1 requires a lower memory refresh frequency when operating in a lower temperature. The LPDDR2 family of devices basically maintains the low power state similar to the LPDDR1 and further includes a function refresh operations can be performed only on a portion of memory columns, further reducing the impact of memory refresh on power consumption and device performance.

Mobile memory devices that have been developed following the LPDDR2 include the LPDDR3 (or LPDDR4) devices and the WideIO memory devices 211. The LPDDR3 (or LPDDR4) provides a relative increase a data transmission speed over earlier generations by increasing the operation speed of a memory. For example, the LPDDR2 has a maximum operation frequency of 533 MHz, while the LPDDR3 has a maximum operation frequency of 800 MHz.

The WideIO memory devices 211 extend bandwidth and increase data transmission amount over the LPDDRx device family by greatly increasing the number of input/output terminals. The WideIO memory device 211 also reduces power consumption by reducing operation frequency. For example, in some embodiments, the WideIO memory device 211 is configured to exchange data through four channels, with each channel having a bandwidth of 128 bits. An operation frequency of each channel is 200 MHz, which corresponds roughly to half the operation frequency of the LPDDR2.

The WideIO memory device 211 offers a relatively low operation frequency but, at the same time, a relatively more data transmission. In view of the fact that a WideIO memory device 211 has a wide bandwidth of 512 bits, it has a relatively high speed of data transmission of 12.8 GBps (or 25.6 GBps) at a relatively low operation frequency of 200 MHz. This corresponds roughly to two times the data throughput in comparison with the LPDDR3, which has a data transmission speed of 6.4 GBps (or 12.8 GBps) at an operation frequency of 800 MHz.

Returning to FIG. 4, in some embodiments, the WideIO memory device 211 can be directly connected to the application processor 220 using a through silicon via (TSV) technology. That is, the WideIO memory device 211 can be stacked on the application processor 220 in the same chip package using TSV technology. Such a configuration offers reduced delay time, reduced power consumption and increased data throughput.

In some embodiments, the WideIO memory device 211 can be divided into four regions and an input/output pad of each bank can be located in a central region of a silicon die. An input/output pad supporting a bandwidth of 128 bits is located in each bank. An input/output pad of each bank can be connected to the application processor 220 through a channel CH1~CH4.

In the present embodiment of FIG. 4, the application processor 220 includes memory controllers 231~234, 23a, and 23b, a channel interleaving unit 240, a central processing unit (CPU) 250, a multimedia processor 260 and a modem processor 270. One or more of the channel interleaving unit 240, central processing unit (CPU) 250, multimedia processor 260 and modem processor 270 can be connected to one another through a bus connection unit 221.

In some embodiments, the application processor 220 includes the memory controllers 231~234, 23a, and 23b configured to access the WideIO memory device 211 and the LPDDRx memory device 212. In some embodiments, the memory controllers 231~234, 23a, and 23b can be connected to the WideIO memory device 211 or the LPDDRx memory device 212 through channels CH1~CH4, CHa~CHb.

In the present example embodiment, the first controller 231 is connected to the WideIO memory device 211 through a first channel CH1. The second through fourth memory controllers 232~234 are similarly connected to the WideIO memory device 211 through second through fourth channels CH2~CH4. Similarly, a memory controller 23a is connected to the LPDDRx memory device 212 through a channel CHa. A memory controller 23b is connected to the LPDDRx memory device 212 through a channel CHb.

If it is assumed that one channel transmits data of 128 bits, the WideIO memory device 211 has a bandwidth that can transmit data of 512 bits and the LPDDRx memory device 212 has a bandwidth that can transmit data of 256 bits. The application processor 220 can be configured to access portions of the WideIO memory device 211 and the LPDDRx memory device 212 through a channel interleaving operation.

The channel interleaving unit 240 operates to control a channel interleaving operation of the application processor 220. Referring to FIG. 4, the channel interleaving unit 240 includes a high bandwidth channel interleaver 241, a low bandwidth channel interleaver 242 and a router 243.

The high bandwidth channel interleaver 241 performs a channel interleaving operation not only among channels of the WideIO memory device 211, but rather among channels of both the WideIO memory device 211 and the LPDDRx memory device 212. The low bandwidth channel interleaver 242 can perform a channel interleaving operation among the a channel CHa and the b channel CHb of the LPDDRx memory device 212.

In an example scenario, the router 243 receives a request for a channel interleaving, for example, in the form of a memory access command, and designates one access to a high bandwidth region or a low bandwidth region. In the case where the router 243 designates access to the high bandwidth region, the high bandwidth channel interleaver 241 is selected, and in a case where the router 243 designates access to the low bandwidth region, the low bandwidth channel interleaver 242 is selected. In a case where the router 243 extends the high bandwidth region of the WideIO memory device 211 to the LPDDRx memory device 212, the router 243 can extend the high-bandwidth region to include a path to the a channel CHa and the b channel CHb of the LPDDRx memory device 212. In this manner, the router 243 can be configured to receive memory access commands and determine, in response to the commands, whether the memory access command is to be transmitted to the high-bandwidth channel interleaver 241 or the low-bandwidth channel interleaver 242. In some embodiments, the determination can be made based on an address associated with each of the memory access commands.

The central processing unit 250 controls an overall operation of the application processor 220 and can optionally further control a channel interleaving operation among the WideIO memory device 211 and the LPDDRx memory device 212. The multimedia processor 260 can optionally access the WideIO memory device 211 and the LPDDRx memory device 212 that are connected to the application processor 220 to process multimedia data and control a multimedia device (not illustrated) external the application processor 220. The modem processor 270 is a processor for performing a wireless communication with a base station or other communication devices and can be configured to access the WideIO memory device 211 and the LPDDRx memory device 212 in a manner similar to the multimedia processor 260.

Performance of an external device such as a multimedia device or a communication device connected to the application processor 220 to be used continues to increase As a result, a main region (for example, the WideIO memory device 211) required by a mobile AP commonly needs to satisfy the requirements of high bandwidth data transmission and large memory size at the same time.

Figure 5:
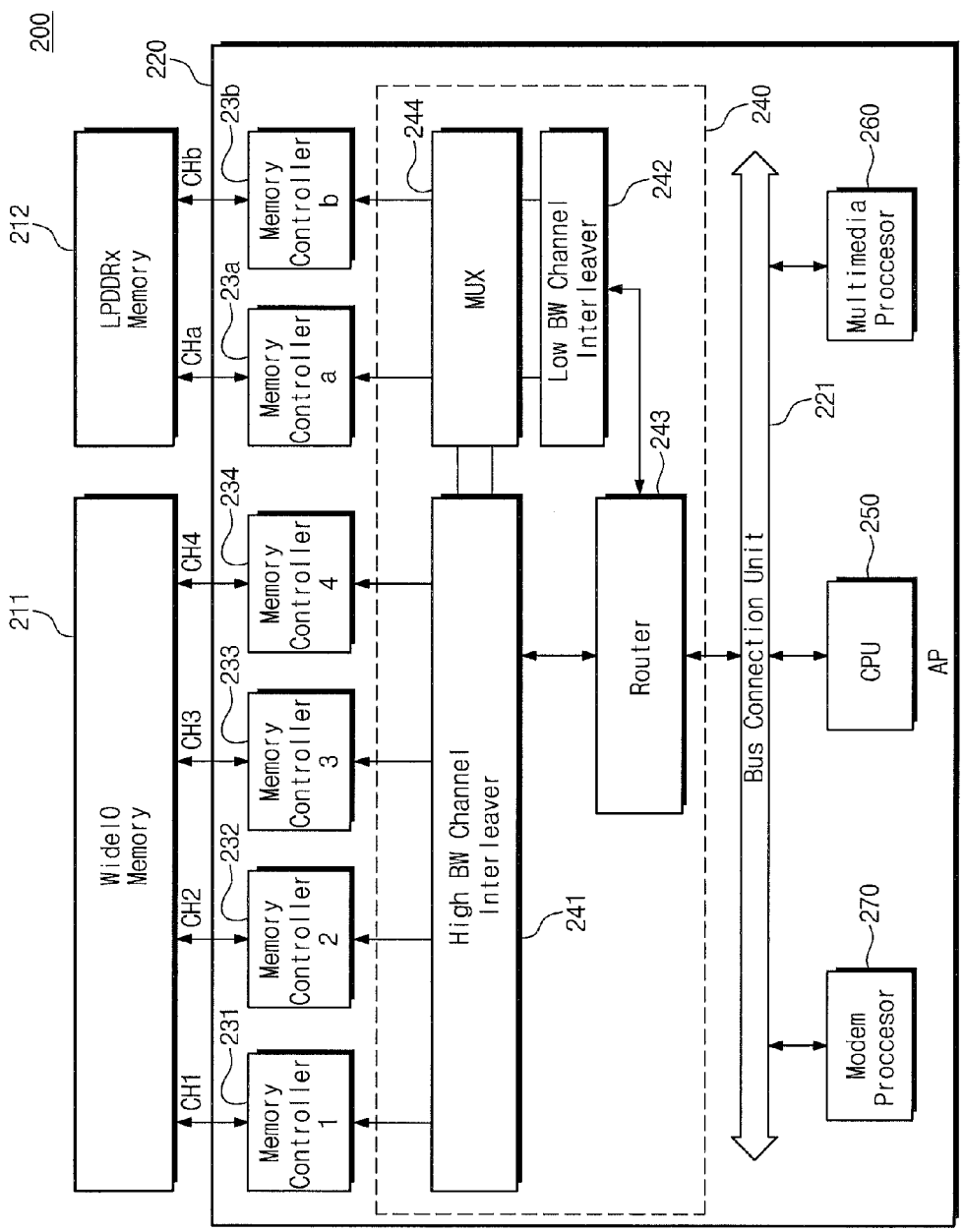
FIG. 5 is a block diagram illustrating a semiconductor device in accordance with another embodiment of the inventive concepts.

FIG. 5 is a block diagram illustrating an example embodiment in which case the channel interleaving unit of the semiconductor device illustrated in FIG. 4 further includes a multiplexer MUX. Referring to FIG. 5, in this embodiment, the channel interleaving unit 240 includes the high bandwidth channel interleaver 241, the low bandwidth channel interleaver 242, the router 243 and the multiplexer 244.

The multiplexer 244 is constructed and arranged to receive a signal from the high bandwidth channel interleaver 241 and the low bandwidth channel interleaver 242, and to select which of the channels of the interleavers 241, 242 is applied to the a channel CHa and the b channel CHb of the LPDDRx memory device 212. The multiplexer 244 can be configured to select none of the channels of the LPDDRx memory device 212, to select all the channels of the LPDDRx memory device 212 or to select a portion of the channels of the LPDDRx memory device 212 for interleaving with the channels of the WideIO memory device. A select signal of the multiplexer 244 can be provided from the high bandwidth channel interleaver 241, the low bandwidth channel interleaver 242 or the router 243. The inventive concept can select and utilize the channels of the LPDDRx memory device 212 in an interleaving operation with the channels of the WideIO memory device, as described herein. In some embodiments, the multiplexer 244 is configured to perform an arbitration among the received memory access commands. In some embodiments, the multiplexer 244 performs the arbitration based on priority information. In some embodiments, the priority information includes priority information of each of the received memory access commands and status information of the channel interleaving unit 240, the status information including urgent information of the high bandwidth channel interleaver 241, urgent information of the low-bandwidth channel interleaver 242 and urgent information of the router 243. In some embodiments, the urgent information being generated based on a status of a buffer for storing the memory access commands.

As described herein, the WideIO memory device 211 is suitable for transmitting data due to its relatively high bandwidth capabilities, however may be limited in its ability to increase in memory size. The semiconductor device 200 in accordance with the inventive concepts can supplement insufficiencies in memory size of the WideIO memory device 211 by utilizing the LPDDRx memory device 212. The inventive concepts allow for this by providing systems and methods that perform a channel interleaving operation among channels of the WideIO memory device and the LPDDRx memory device to further extend the high bandwidth region of the device 200

In some embodiments, during a low-power mode of operation of the SoC, the interleaving unit 240 performs the memory interleave operation among the plurality of access channels of the Wide I/O memory device. In some embodiments, during a high-power mode of operation of the SoC, the interleaving unit performs the memory interleave operation among the plurality of access channels of the Wide I/O memory device and the at least one of the one or more access channels of the LPDDR memory device.

FIGS. 6-11 are schematic views for explaining a channel interleaving operation of the semiconductor device illustrated herein, in accordance with the inventive concepts.

Figure 6:
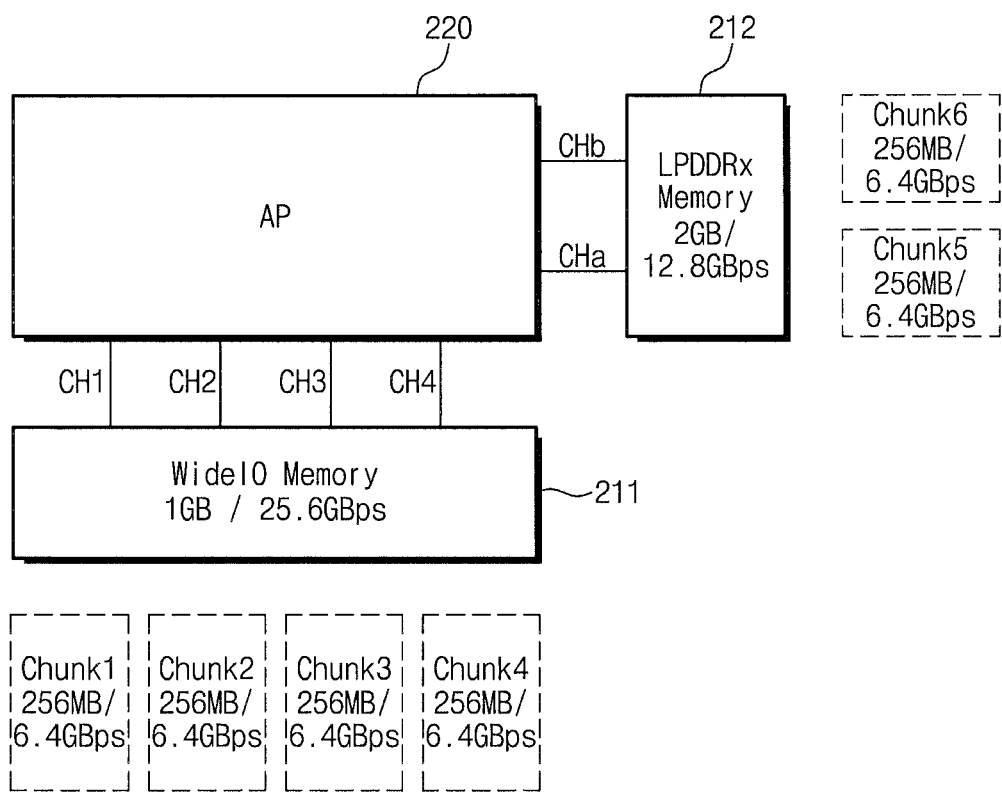
FIGS. 6-11 are schematic views for explaining a channel interleaving operation of the semiconductor devices illustrated herein, in accordance with embodiments of the inventive concepts.

Referring to FIG. 6, the WideIO memory device 211 is connected to the application processor 220 through the first through fourth channels CH1~CH4 and has a memory size of 1 GB and a data transmission speed of 25.6 GBps. The WideIO memory device 211 can be partitioned into chunk units. In some embodiments, a data size of a first chunk is 256 MB and first chunk data is transmitted through the first channel CH1 at a speed of 6.4 GBps. Similarly, second through fourth chunk data are transmitted through the second through fourth channels CH2~CH4 respectively, each having a size of 256 MB and a speed of 6.4 GBps.

The LPDDRx memory device 212 is connected to the application processor 220 through the a channel CHa and the b channel CHb and has a memory size of 2 GB and a data transmission speed of 12.8 GBps. Like the WideIO memory device 211, the LPDDRx memory device 212 can be partitioned into chunk units. A data size of a fifth chunk is 256 MB and fifth chunk data is transmitted through the a channel CHa at a speed of 6.4 GBps. Similarly, sixth chunk data has a data size of 256 MB and is transmitted through the b channel CHb at a speed of 6.4 GBps.

To further illustrate the inventive concepts, referring back to the embodiment of FIGS. 1-4, for example, the CPU 150, Multimedia Processor 160, modem 170, or the like, such devices referred to herein collectively as a "master", can generate one or more requests to access the memory devices 111, 112. In an example embodiment, the master 150, 160, 170 can generate first and second access requests, each request including address information. In the event the address of the first request is assigned to a high-bandwidth region 101 of memory, a router 243 of the channel interleaving unit 240 can be configured to transmit the first request to the high bandwidth channel interleaver 241. Accordingly, the first request is partitioned into 6 pieces by the high bandwidth channel interleaver 241, which high bandwidth channel interleaver 241, in turn, transmits 4 pieces to WideIO Memory 211 through memory controllers 1-4 231-234 and the other 2 pieces to LPDDRx Memory 212 through memory controller 23a, 23b. Assuming the address of the second request is assigned to a low-bandwidth region 102 of memory, the router 243 can be configured to transmit the request to the low-bandwidth channel interleaver 242. As a result, the second request is divided into 2 pieces by the low-bandwidth channel interleaver 242. The low-bandwidth channel interleaver 242 operates to transmit the 2 pieces of the second request to LPDDRx Memory 212 through the memory controller 23a, 23b.

Further to the present example, in the event a CPU 150 generates a first request that includes address information assigned to the high-bandwidth region, and Multimedia Processor 160 generates a second request that includes address information assigned to the low-bandwidth region at the same time as the first request, the router 243 will transmit the first request to the high-bandwidth channel interleaver 241 and the second request 242 to the low-bandwidth channel interleaver. Accordingly, the two pieces of the first request and the second request will result in a conflict in access to the LPDDRx Memory 212. In such a case, the memory Controller 23a, 23b or MUX 244 can be configured to arbitrate the priority of the conflicting requests.

Figure 7:
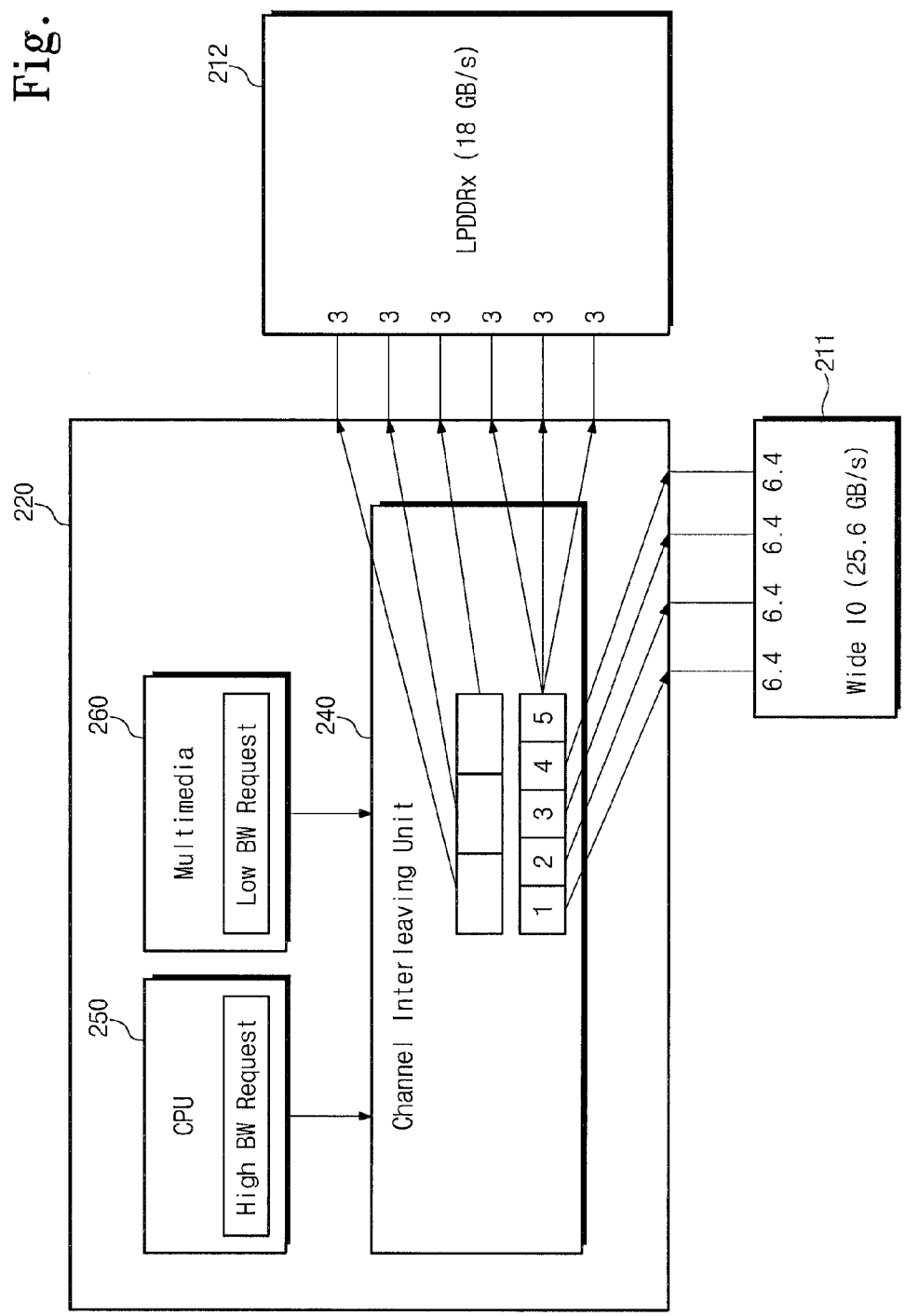

Referring to FIG. 7, in some embodiments, the SOC comprises an application processor 220, a WideIO Memory 211 having a data transmission speed of 25.6 GBps and 4 channels, and a LPDDRx Memory 212 having a data transmission speed of 18 GBps and 6 channels. Each channel of WideIO memory 211 is allocated 6.4 GBps and each channel of LPDDRx memory 212 is allocated 3 GBps. In the present example, it is assumed that a high bandwidth request is to be divided into 5 pieces. In this case, piece 5 of the high bandwidth request is allocated to be serviced by 3 channels of LPDDRx memory 212, because the piece 5 of the high-bandwidth request requires at least 6.4 GB/s bandwidth to meet the requirements of the channel data transmission rates of the other four pieces 1~4 of the high-bandwidth request. The other 3 channels of the LPDDRx memory 212 can be reserved to service low-bandwidth requests. Accordingly, in the event the CPU 250 generates a first request that includes address information assigned to the high-bandwidth region and the Multimedia Processor 260 generates a second request that includes address information assigned to the low bandwidth region at the same time, the router 243 will transmit the first request to the high-bandwidth channel interleaver 241 and the second request to the low-bandwidth channel interleaver 242 (see FIG. 5). Accordingly, the high-bandwidth channel interleaver 241 services the 1st, 2nd, 3rd, and 4th pieces of the high-bandwidth request through 4 channels of WideIO Memory 211, and the low-bandwidth channel interleaver 242 services the 5th piece of the high-bandwidth request through 3 channels of LPDDRx memory 212 and services the low-bandwidth request through the other 3 channels of LPDDRx memory 212.

Figure 8:
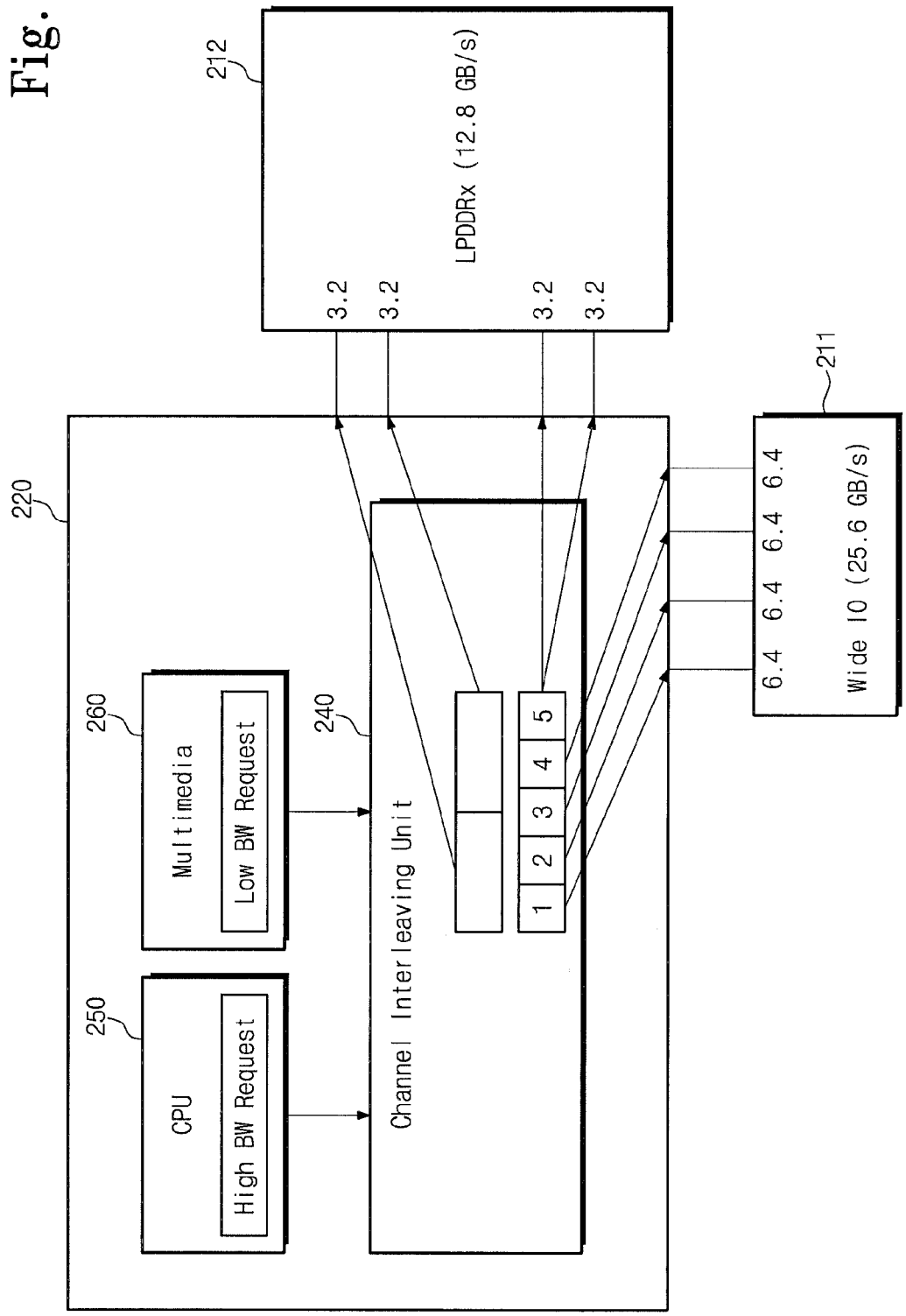

Referring to FIG. 8, in some embodiments, the SOC comprises an application processor 220, a WideIO Memory 211 having a data transmission speed of 25.6 GBps and 4 channels, and a LPDDRx Memory 212 having a data transmission speed of 12.8 GBps and 4 channels. Each channel of WideIO memory 211 is allocated 6.4 GBps and each channel of LPDDRx memory 212 is allocated 3.2 GBps. In the present example, it is assumed that a high bandwidth request is to be divided into 5 pieces. In this case, piece 5 of the high bandwidth request is allocated to be serviced by 2 channels of LPDDRx memory 212, because the piece 5 of the high-bandwidth request requires at least 6.4 GB/s bandwidth to meet the requirements of the channel data transmission rates of the other four pieces 1-4 of the high-bandwidth request. The other 2 channels of the LPDDRx memory 212 can be reserved to service low-bandwidth requests. Accordingly, in the event the CPU 250 generates a first request that includes address information assigned to the high-bandwidth region and the Multimedia Processor 260 generates a second request that includes address information assigned to the low bandwidth region at the same time, the router 243 will transmit the first request to the high-bandwidth channel interleaver 241 and the second request to the low-bandwidth channel interleaver 242 (see FIG. 5). Accordingly, the high-bandwidth channel interleaver 241 services the 1st, 2nd, 3rd, and 4th pieces of the high-bandwidth request through 4 channels of WideIO Memory 211, and the low-bandwidth channel interleaver 242 services the 5th piece of the high-bandwidth request through 2 channels of LPDDRx memory 212 and services the low-bandwidth request through the other 2 channels of LPDDRx memory 212.

Figure 9:
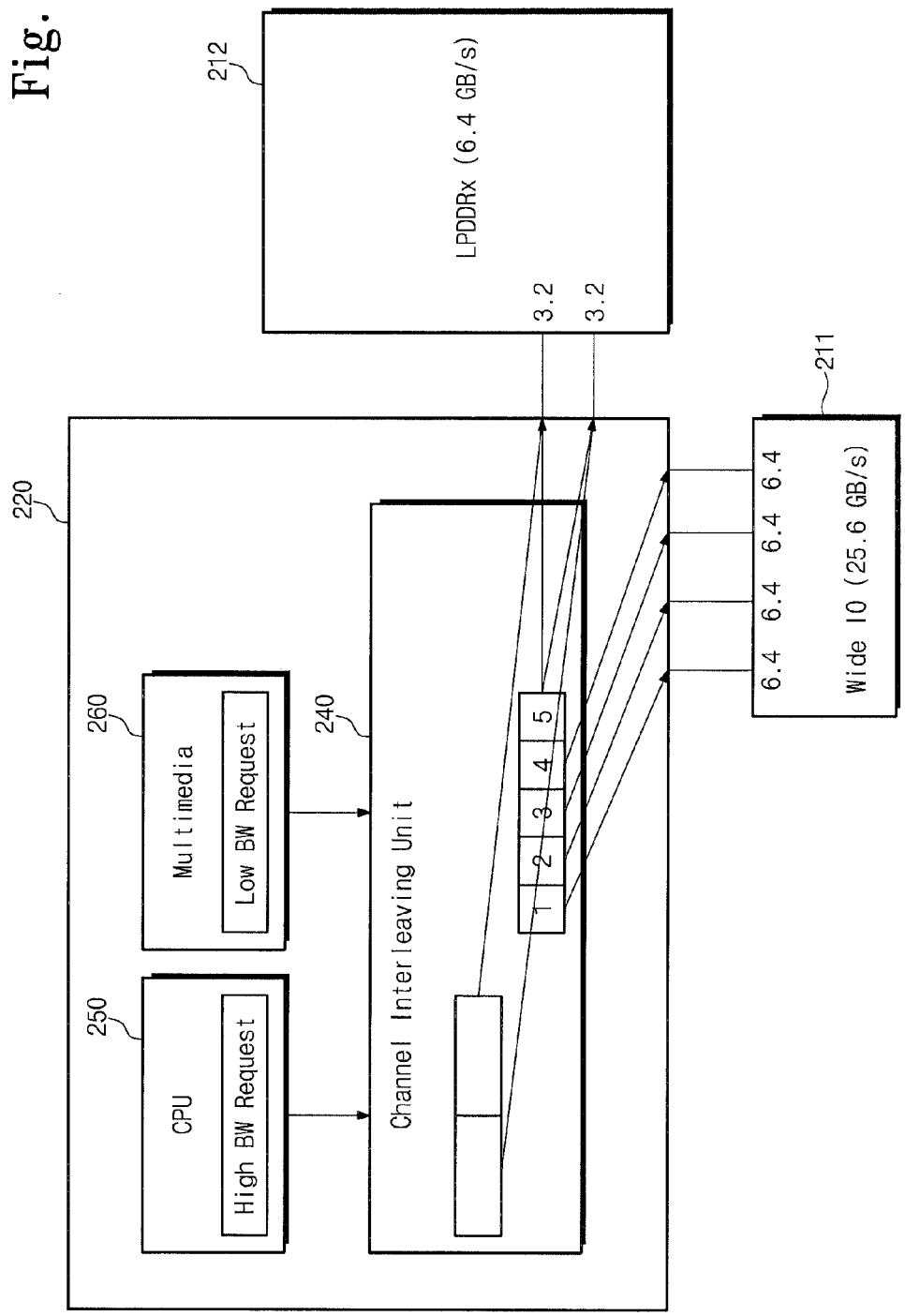

Referring to FIG. 9, in some embodiments, the SOC comprises an application processor 220, a WideIO Memory 211 having a data transmission speed of 25.6 GBps and 4 channels, and a LPDDRx Memory 212 having a data transmission speed of 6.4 GBps and 2 channels. Each channel of WideIO memory 211 is allocated 6.4 GBps and each channel of LPDDRx memory 212 is allocated 3.2 GBps. In the present example, it is assumed that a high bandwidth request is to be divided into 5 pieces. In this case, piece 5 of the high bandwidth request is allocated to be serviced by 2 channels of LPDDRx memory 212, because the piece 5 of the high-bandwidth request requires at least 6.4 GB/s bandwidth to meet the requirements of the channel data transmission rates of the other four pieces 1-4 of the high-bandwidth request. Accordingly, in the event the CPU 250 generates a first request that includes address information assigned to the high-bandwidth region and the Multimedia Processor 260 generates a second request that includes address information assigned to the low bandwidth region at the same time, the router 243 will transmit the first request to the high-bandwidth channel interleaver 241 and the second request to the low-bandwidth channel interleaver 242 (see FIG. 5). Accordingly, the high-bandwidth channel interleaver 241 services the 1st, 2nd, 3rd, and 4th pieces of the high-bandwidth request through 4 channels of WideIO Memory 211, and the low-bandwidth channel interleaver 242 services the 5th piece of the high-bandwidth request through 2 channels of LPDDRx memory 212. In this manner, the low-bandwidth channel interleaver first services the 5th piece of the high-bandwidth request through 2 channels of LPDDRx memory 212 and then services a low-bandwidth request through the through 2 channels of LPDDRx memory 212.

Figure 10:
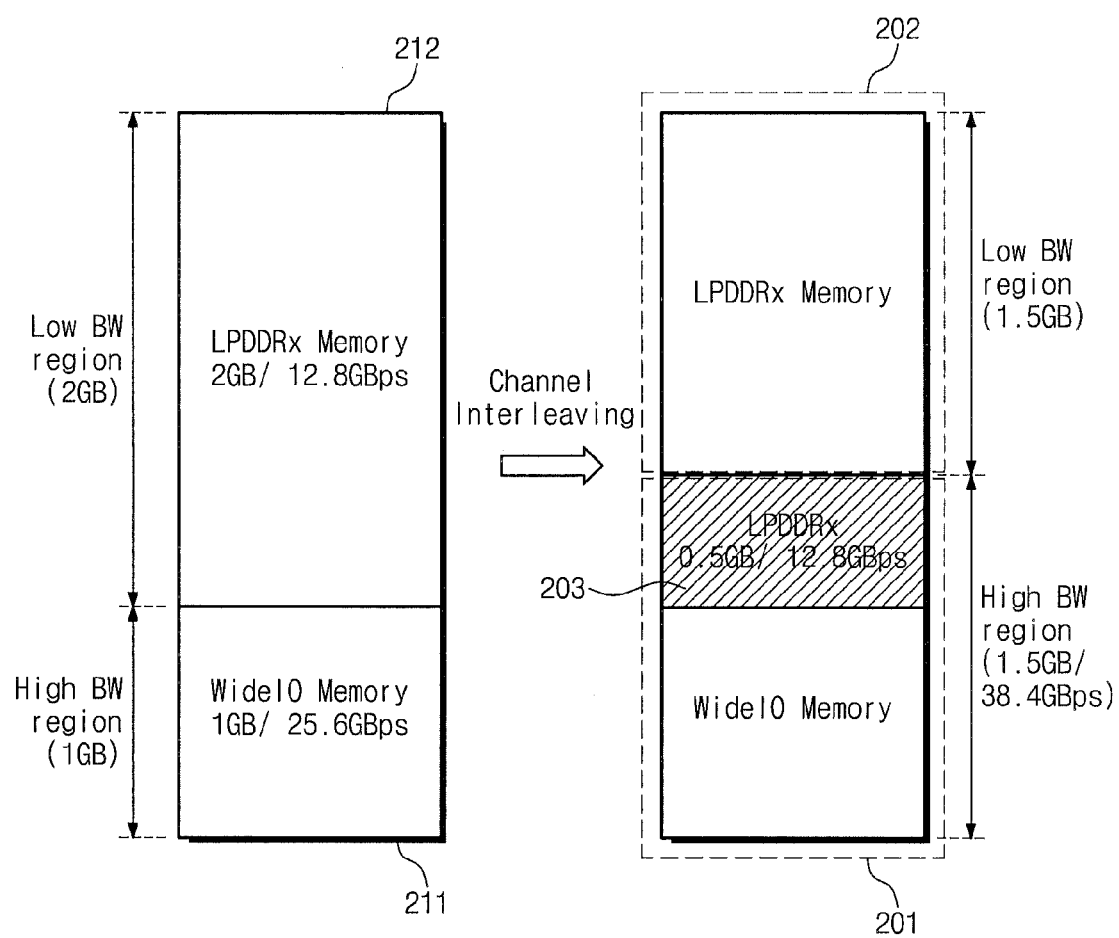

Referring to FIG. 10, in this example, before the application processor 220 performs a channel interleaving operation, the WideIO memory device 211 had a memory size of 1 GB and a data transmission bandwidh of 25.6 GBps and the LPDDRx memory device 212 had a memory size of 2 GB and a data transmission bandwidth of 12.8 GBps. As illustrated in FIG. 10, prior to the interleaving operation, a high bandwidth region has a memory size of 1 GB corresponding to the WideIO memory 211. A low bandwidth region has a memory size of 2 GB corresponding to the LPDDRx memory device 212.

In accordance with the inventive concepts, the application processor 220 can assign a portion 203 (see hashed region) of the LPDDRx memory device 212 as a high bandwidth region by virtue of a channel interleaving operation in accordance with the inventive concepts. The portion 203 which belongs to the LPDDRx memory device 212 but is used as a high bandwidth region includes two chunk data portions (refer to the fifth and sixth chunks of FIG. 6) and has a memory size of 0.5 GB and a data transmission bandwidth of 12.8 GBps. Referring to FIG. 10, during a channel interleaving operation, the high bandwidth region 201 has a memory size of 1.5 GB and a data transmission bandwidth of 38.4 GBps. The remaining low bandwidth region 202 has a memory size of 1.5 GB.

Figure 11:
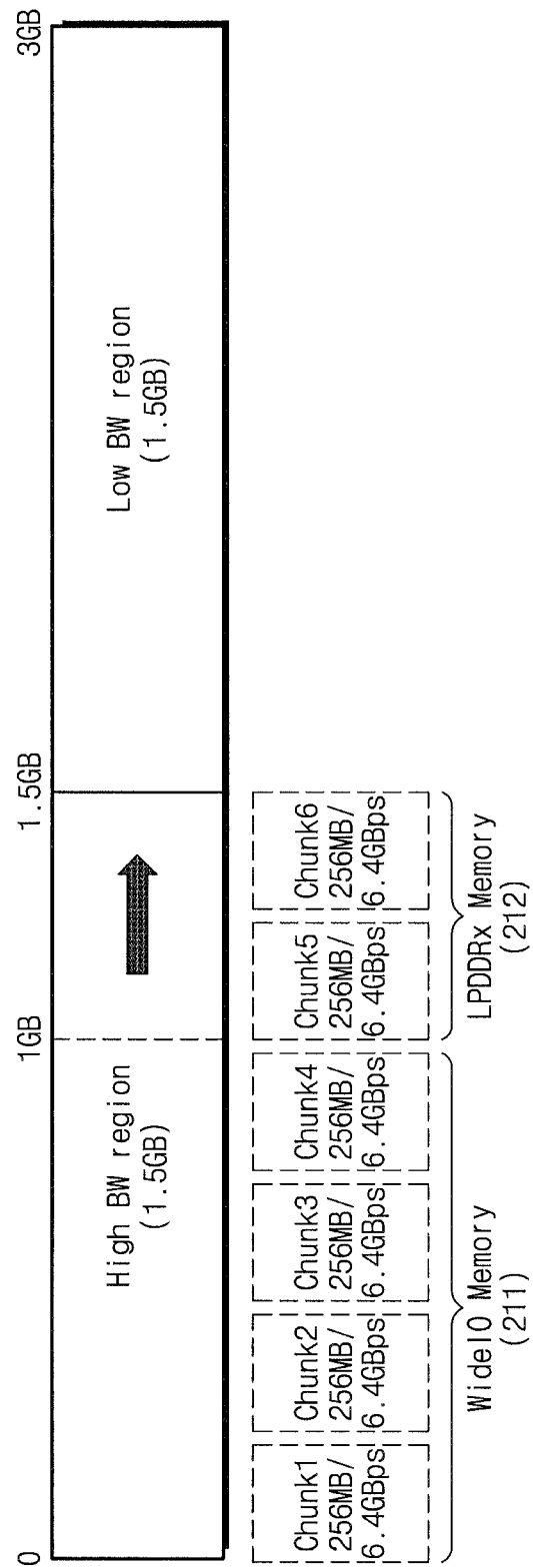

Referring to FIG. 11, in an exemplary embodiment, the memory size of the high bandwidth region 201 can be extended from 1 GB to 1.5 GB by incorporating a channel interleaving operation in accordance with the present inventive concepts. That is, the application processor 220 can, by initiating the interleaving operation, cause the high bandwidth region 201 to have a memory size of 1.5 GB and a data transmission bandwidth of 38.4 GBps using the first through fourth chunks (chunk1~chunk4) of the WideIO memory device 211 and the fifth and sixth chunks (chunk5 and chunk6) of the LPDDRx memory device 212.

Figure 12:
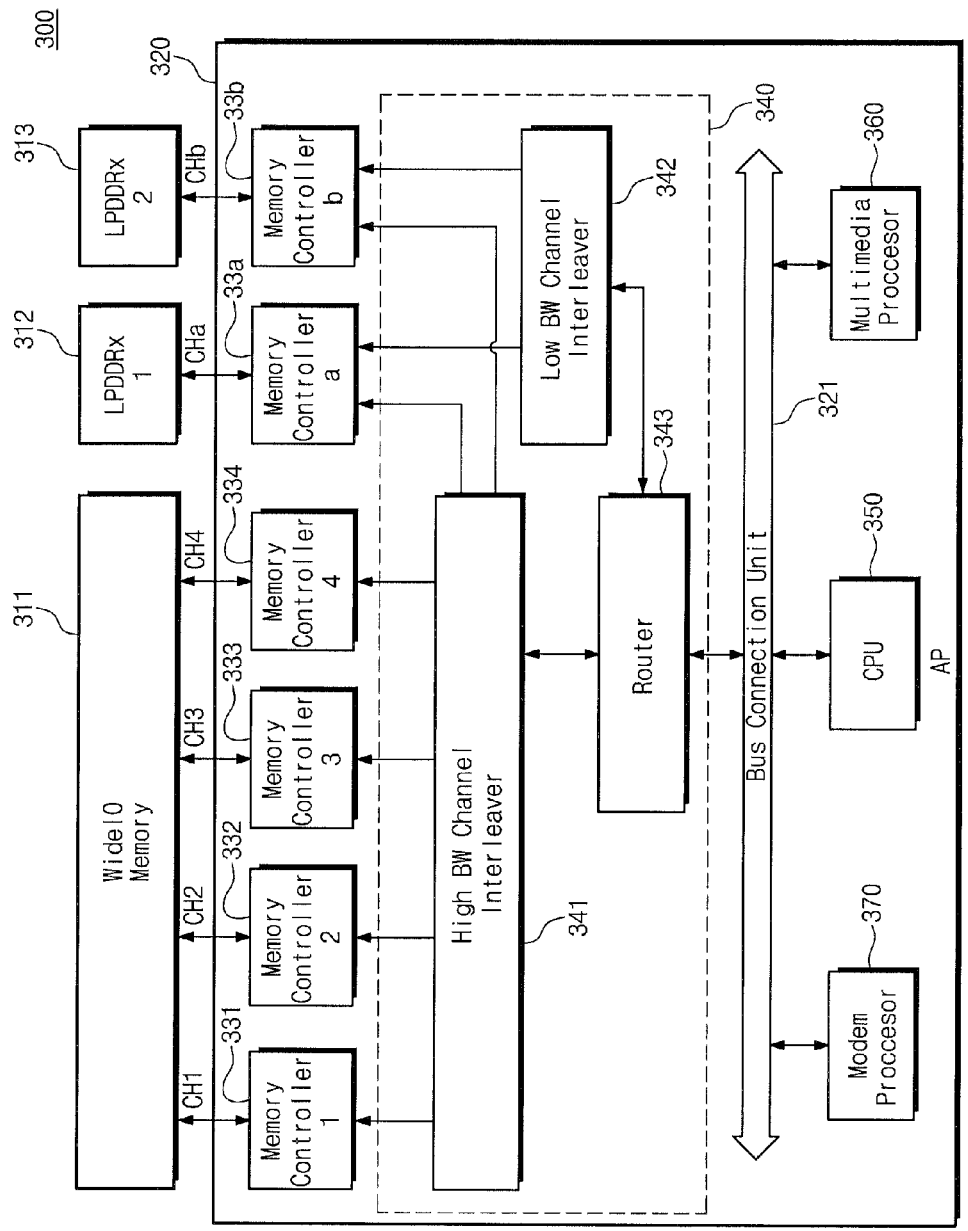
FIG. 12 is a block diagram illustrating a semiconductor device in accordance with another embodiment of the inventive concepts.
Figure 18:
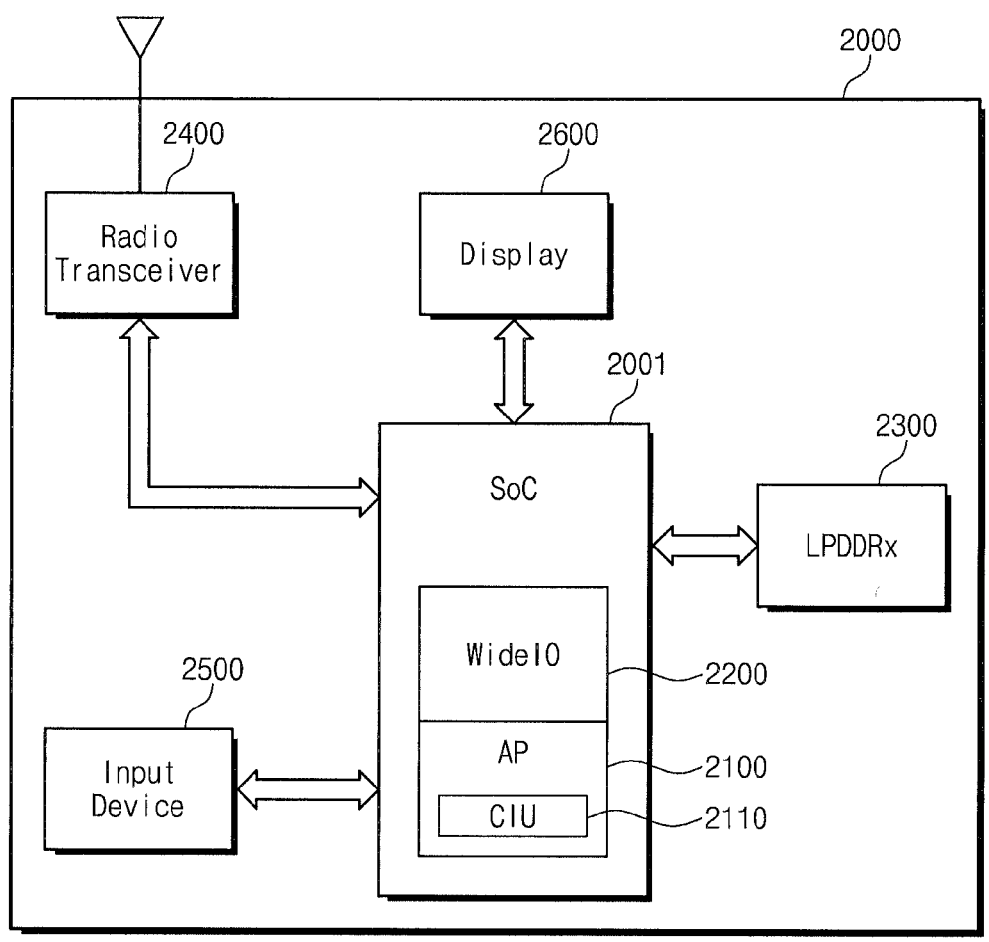

FIG. 12 is a block diagram illustrating a semiconductor device in accordance with another embodiment of the inventive concepts. Referring to FIG. 12, a semiconductor device 300 includes a WideIO memory device 311, a first LPDDRx memory device 312, a second LPDDRx memory device 313 and an application processor 320. In some embodiments, the WideIO memory device 311 and the application processor 320 can be embodied in a system on chip (SoC), for example, as shown in the embodiment of FIG. 18.

In the present embodiment, the WideIO memory device 311 can be considered a high bandwidth memory device and the first and second LPDDRx memories 312 and 313 can be considered a low bandwidth memory device. The application processor 320 includes memory controllers 331~334, 33a and 33b, a channel interleaving unit 340, a central processing unit (CPU) 350, a multimedia processor 360 and a modem processor 370. The central processing unit (CPU) 350, the multimedia processor 360 and the modem processor 370 can be connected to one another through a bus connection unit 321. The channel interleaving unit 340 includes a high bandwidth channel interleaver 341, a low bandwidth channel interleaver 342 and a router 343.

In the embodiments of the type depicted in FIGS. 4 and 5, the semiconductor device 200 is configured to supplement an insufficient memory size of the WideIO memory device 211 by employing a single LPDDRx memory device 212 having two channels CHa and CHb in an interleaving operation in accordance with the inventive concepts. In the semiconductor device 300 of the type illustrated in FIG. 12, an insufficient memory size of the WideIO memory 311 can be supplemented by including multiple LPDDRx memory devices 312 and 313, that are separate from each other, or independent of each other. Although two LPDDRx memory devices 312 and 313 are shown, more than two devices 312, 313 can be employed for this purpose. The inventive concepts of the embodiment of FIG. 12 can perform channel interleaving operation among the WideIO memory device 311 and the multiple LPDDRx memory devices 312, 313 to extend the high bandwidth region of the semiconductor device 300.

Figure 13:
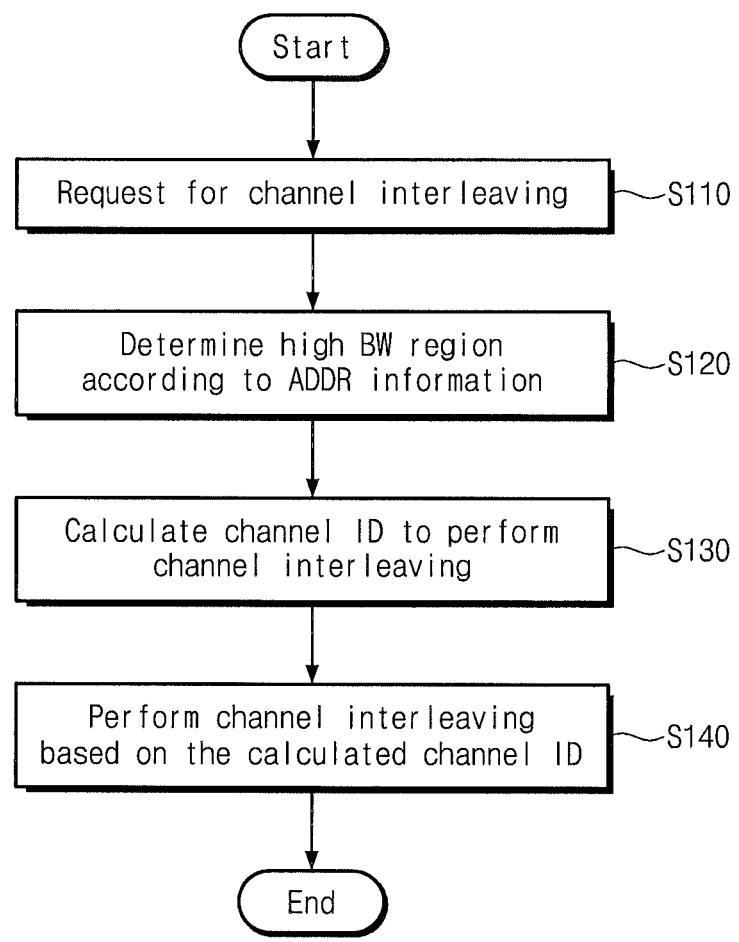
FIG. 13 is a flow diagram for explaining a channel interleaving operation of a semiconductor device in accordance with an embodiment of the inventive concepts.

FIG. 13 is a flow diagram for explaining a channel interleaving operation of a semiconductor device in accordance with an embodiment of the inventive concept. The channel interleaving operation illustrated in FIG. 13 may be performed, for example, by the memory controller 130 of FIG. 1 or may be performed by the channel interleaving units 240 and 340 of the embodiments of FIGS. 4, 5 and 12. Hereinafter, a channel interleaving operation as performed by the channel interleaving unit 240 of the embodiment FIG. 4 will be described. However, the same principles apply to the other embodiments of the present inventive concepts.

In a step S110, the channel interleaving unit 240 of the application processor 220 receives a request for a channel interleaving operation. In a step S120, the channel interleaving unit 240 determines the requisite size of the high bandwidth region according to address information of the request. In other words, the channel interleaving unit 240 determines whether the high bandwidth region is to be maintained in the WideIO memory device 211 or whether the high bandwidth region will extend to the LPDDRx memory device 212. In a step S130, a channel ID that will perform a channel interleaving operation is calculated. The channel ID that will perform a channel interleaving operation can be calculated with reference to a memory access address ADDR. In a step S140, a channel interleaving operation is performed based on the calculated channel ID.

In the semiconductor device in accordance with embodiments of the inventive concepts, an application processor performs a channel interleaving operation between different kinds of at least two memory devices (e.g., WideIO memory device, LPDDRx memory device) having different bandwidths relative to each other. As a result, in the case that a memory size of a high bandwidth memory device, for example WideIO memory, is insufficient, a portion of a low bandwidth memory device, for example, LPDDRx memory, can be re-assigned, or otherwise allocated, to the high bandwidth region of the system.

Figure 14:
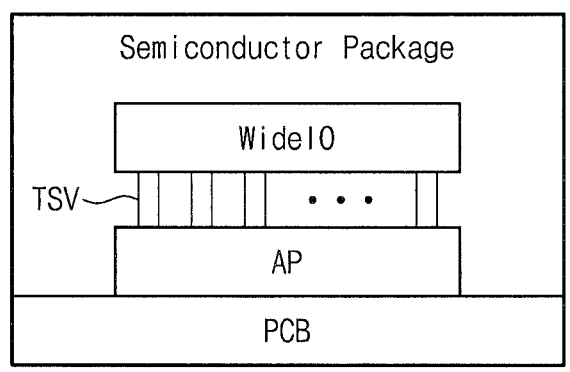
FIGS. 14, 15 and 16 are cross sectional views illustrating a structure of a semiconductor device in accordance with embodiments of the inventive concepts.
Figure 15:
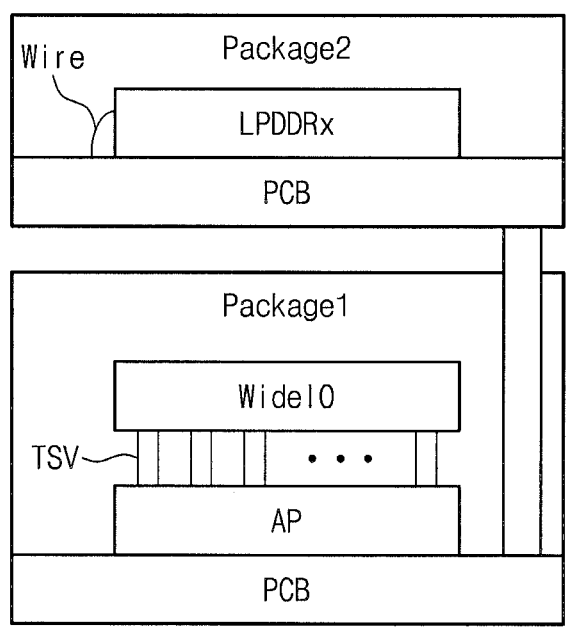
Figure 16:
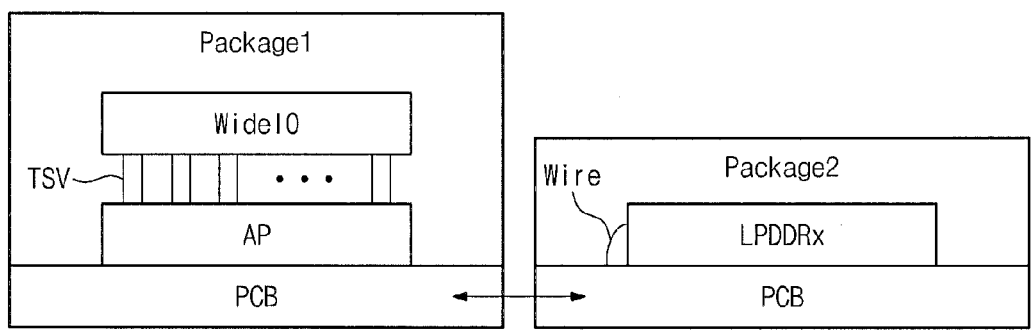

FIGS. 14 through 16 are cross sectional views illustrating a structure of a semiconductor device in accordance with an embodiment of the inventive concept.

FIG. 14 illustrates a semiconductor package whereby an application processor (AP) and a WideIO memory chip are die-to-die interconnected. In the semiconductor package illustrated in FIG. 14, the application processor (AP) and the WideIO memory chip are directly connected to each other for example using a through silicon via (TSV) technology. In this example, a package on package (PoP) method is not employed wherein the application processor (AP) and the WideIO memory chip are independently packaged, and then the packages are repackaged again and connected to each other. Referring to FIG. 14, in this embodiment, the application processor (AP) is formed on a printed circuit board (PCB), and then the application processor (AP) and the WideIO memory chip are connected to each other through TSV.

FIG. 15 illustrates a package on package (PoP) configuration wherein an LPDDRx memory chip package is stacked on the semiconductor package illustrated in FIG. 14. Referring to FIG. 15, in the package on package (PoP) configuration, a second package (package 2) is stacked on a first package (package 1). The first package (package 1) is the semiconductor package illustrated in FIG. 14 and the second package (package 2) is a semiconductor package including the LPDDRx memory chip applied to a printed circuit board (PCB). The resulting second package (package 2) is connected to the printed circuit board (PCB) of the first package (package 1) through a wire.

FIG. 16 illustrates an example embodiment wherein the first and second packages illustrated in FIG. 15 are each mounted on a printed circuit board respectively. Referring to FIG. 16, the first package connects the application processor (AP) and the WideIO memory chip to each other through a TSV arrangement and the second package connects the LPDDRx memory chip to a printed circuit board through a wire. The first package and the second package are electrically connected to each other using customary signal lines.

The semiconductor device in accordance with embodiments of the inventive concepts can be applied to various products. The semiconductor device in accordance with embodiments of the inventive concepts can be used in electronic devices such as a digital cameras, a camcorders, a mobile phones, smart phones, tablet PCs, electronic book technology, etc.

Figure 17:
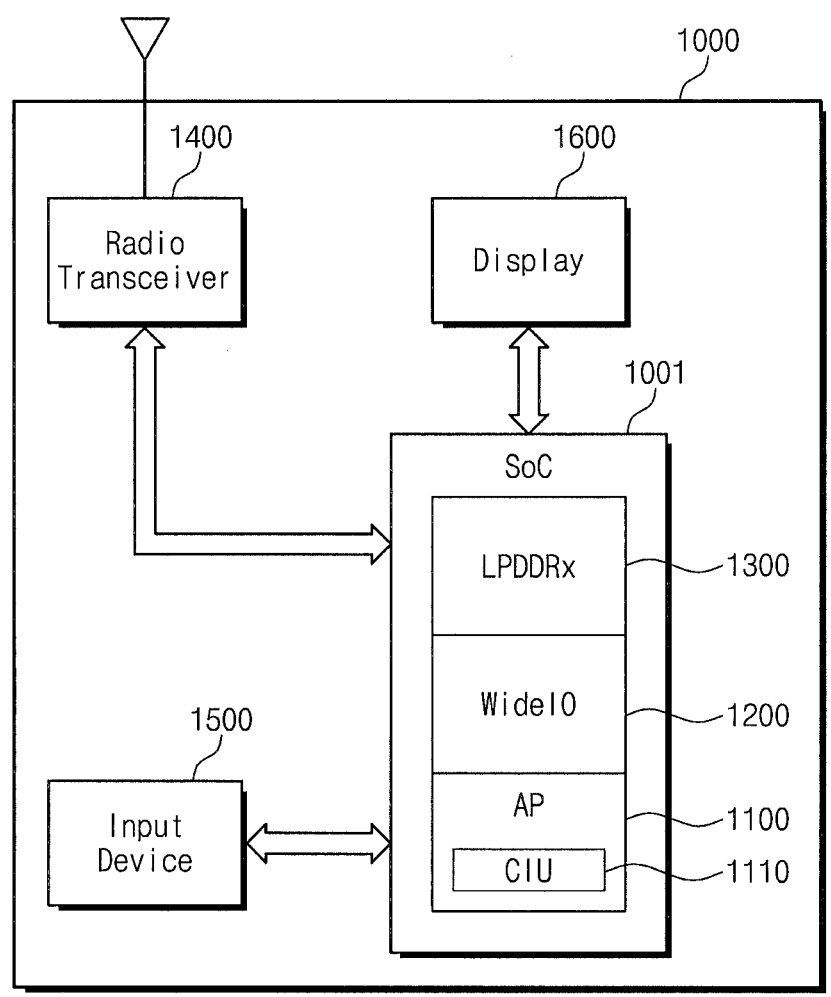
FIGS. 17 and 18 are block diagrams illustrating a mobile device including a channel interleaving unit (CIU) in accordance with embodiments of the inventive concepts.

FIGS. 17 and 18 are block diagrams illustrating a mobile device including a channel interleaving unit (CIU) in accordance with an embodiment of the inventive concept. Mobile devices 1000 and 2000 illustrated in FIGS. 17 and 18 can be embodied, for example, in a wireless internet device such as a cellular phone, a smart phone, a tablet PC, etc.

Referring to FIG. 17, the mobile device 1000 includes a system on chip (SoC) 1001. In some embodiments, the system on chip (SoC) 1001 can be manufactured in the form of the package on package (PoP) described in FIG. 15. The system on chip (SoC) 1001 includes an application processor 1100 including a channel interleaving unit 1110, a WideIO memory device 1200 and an LPDDRx memory device 1300. The channel interleaving unit 1110 in the application processor 1100 can perform a channel interleaving operation among channels of the WideIO memory device 1200 and the LPDDRx memory device 1300.

A radio transceiver 1400 can transmit or receive radio signals through an antenna. The radio transceiver 1400 can convert radio signals received through an antenna into signals which the system on chip 1001 can process. The system on chip 1001 performs a data processing on signals output by the radio transceiver 1400, and the system on chip 1001 can store the processed data in the WideIO memory 1200 and/or the LPDDRx memory 1300, or display the processed data at a display 1600.

The radio transceiver 1400 can convert signals output from the system on chip 1001 into radio signals to output the converted radio signals to an external location through an antenna.

An input device 1500 can input control signals for controlling an operation of the system on chip 1001 or data to be processed by the system on chip 1001. The input device 1500 can be embodied by a pointing device such as a touch pad and a computer mouse, a keypad or a keyboard, or other suitable input devices such as voice recognition or movement recognition.

The system on chip 1001 can control an operation of the display 1600 so that data output from the WideIO memory device 1200 or the LPDDRx memory device 1300, radio signals output from the radio transceiver 1400, or data output from the input device 1500 is displayed through the display 1600.

Referring to FIG. 18, the mobile device 2000 of this embodiment includes a system on chip 2001, an LPDDRx memory 2300, a radio transceiver 2400, an input device 2500 and a display 2600. The system on chip 2001 can be manufactured in the form of the semiconductor package described in FIG. 14. The system on chip 2001 includes an application processor 2100 including a channel interleaving unit 2110 and a WideIO memory 2200. The channel interleaving unit 2110 in the application processor 2100 can perform a channel interleaving operation among channels of the WideIO memory device 2200 and the LPDDRx memory device 2300.

Figure 19:
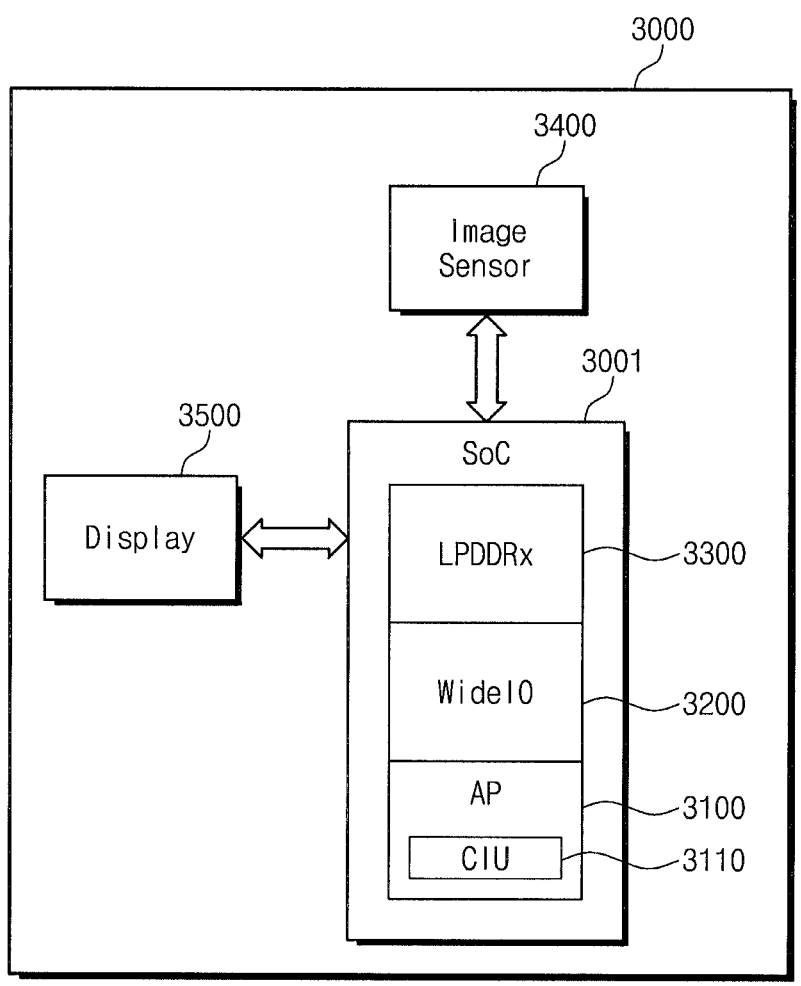
FIGS. 19 and 20 are block diagrams illustrating another application example of an electronic device including a channel interleaving unit (CIU) in accordance with embodiments of the inventive concepts.
Figure 20:
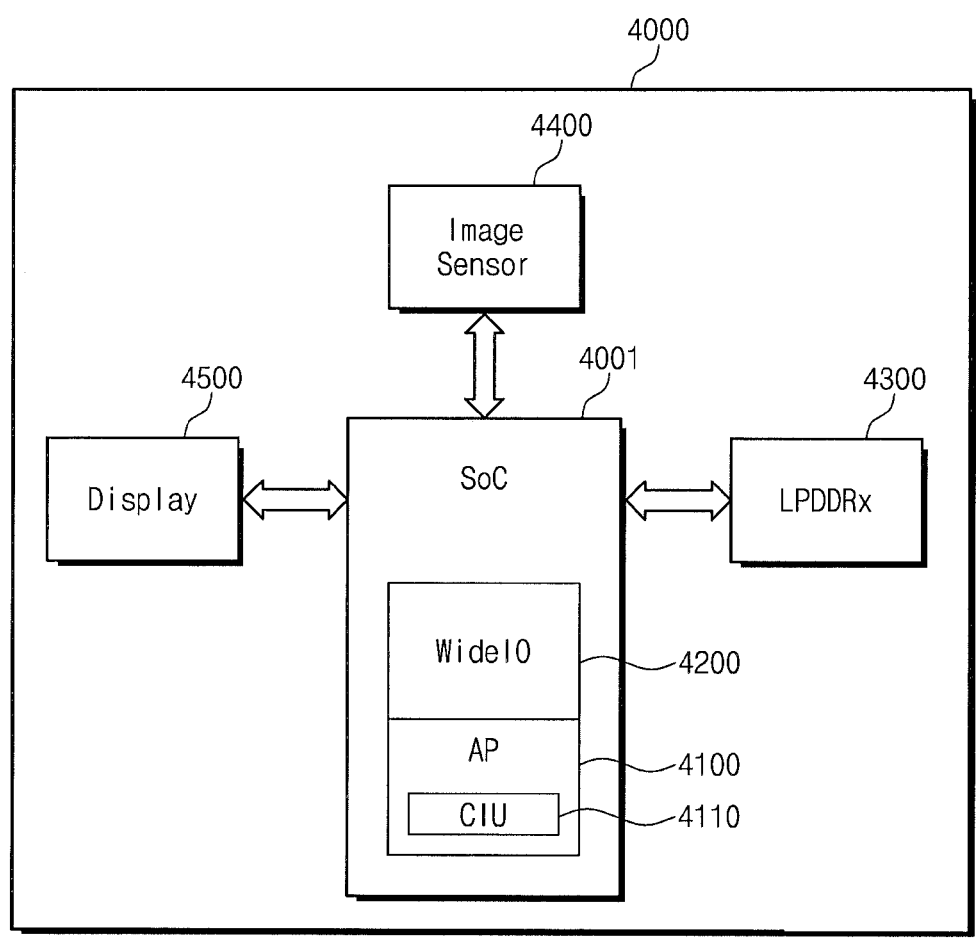

FIGS. 19 and 20 are block diagrams illustrating another application example of an electronic device including a channel interleaving unit (CIU) in accordance with embodiments of the inventive concepts. Referring to FIGS. 19 and 20, electronic devices 3000 and 4000 include system on chips 3001 and 4001 including channel interleaving units 3110 and 4110 respectively. The channel interleaving units 3110 and 4110 in the system on chips 3001 and 4001 can perform a channel interleaving operation between channels of the WideIO memory devices 3200 and 4200 and channels of the LPDDRx memory devices 3300 and 4300 respectively.

Image sensors 3400 and 4400 of the electronic devices 3000 and 4000 illustrated in FIGS. 19 and 20 can convert optical images into digital signals. The system on chip 3001 and 4001 process the converted digital signals to generate data on the basis of a virtual address, convert the virtual address into a physical address and store data in a physical address of the WideIO memory devices 3200 and 4200 or the LPDDRx memory devices 3300 and 4300. The data can be displayed through displays 3500 and 4500 under the control of the system on chips 3001 and 4001.

The semiconductor device in accordance with the inventive concept can be mounted using various types of packages such as PoP (package on package), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

In accordance with embodiments of the present inventive concepts, in a case where a storage space of a high bandwidth memory, for example WideIO memory, is insufficient, a portion of a low bandwidth memory, for example LPDDRx memory, can be reassigned to be used as a high bandwidth region by performing a channel interleaving operation among channels of the high bandwidth and low bandwidth memory devices (e.g., WideIO memory device, LPDDRx memory device).

The above-disclosed subject matter is to be considered illustrative, and not restrictive, and the appended claims are intended to cover all such modifications, enhancements, and other embodiments, which fall within the true spirit and scope of the inventive concepts. Thus, to the maximum extent allowed by law, the scope of the inventive concepts is to be determined by the broadest permissible interpretation of the following claims and their equivalents, and shall not be restricted or limited by the foregoing detailed description.

What is claimed is:

1. A system on chip (SoC) comprising:
   a high-bandwidth memory device having a plurality of access channels;
   a first low-bandwidth memory device having one or more access channels, the high-bandwidth memory device having a higher operation bandwidth than the first low-bandwidth memory device; and
   an interleaving unit configured to perform a memory interleave operation among the plurality of access channels of the high-bandwidth memory device and at least one of the one or more access channels of the first low-bandwidth memory device,
   wherein the interleaving unit comprises:
      a high-bandwidth channel interleaver in communication with the high-bandwidth memory device and the first low-bandwidth memory device and configured to manage a memory interleave operation among the plurality of access channels of the high-bandwidth memory device and configured to manage the memory interleave operation among the plurality of access channels of the high-bandwidth memory device and the at least one of the one or more access channels of the first low-bandwidth memory device,
      a low-bandwidth channel interleaver configured to manage the memory interleave operation among the remaining access channels of the first low-bandwidth memory device other than the at least one access channel of the first low-bandwidth memory device managed by the high-bandwidth channel interleaver, and
      a router configured to receive a request for a channel interleaving and configured to designate one of access to a high-bandwidth region and a low-bandwidth region,
      wherein, when the router designates access to the high-bandwidth region, the high-bandwidth channel interleaver is selected, when the router designates access to the low-bandwidth region, the low-bandwidth channel interleaver is selected, and, when the router extends the high-bandwidth region, the router extends the high-bandwidth region to include a path to the at least one access channel of the low-bandwidth memory device.

2. The SoC of claim 1, wherein the interleaving unit comprises a memory controller in communication with the high-bandwidth memory device and the first low-bandwidth memory device.

3. The SoC of claim 1, wherein the first low-bandwidth memory device comprises a plurality of access channels, and the interleaving unit performs a memory interleave operation among the plurality of access channels of the high-bandwidth memory device and the plurality of access channels of the first low-bandwidth memory device.

4. The SoC of claim 1, wherein the interleaving unit performs a mode of operation of the SoC among one of:
an interleave operation among the plurality of access channels of the high-bandwidth memory device;
an interleave operation among the one or more access channels of the first low-bandwidth memory device; and
an interleave operation among the plurality of access channels of the high-bandwidth memory and the at least one of the one or more access channels of the first low-bandwidth memory device.

5. The SoC of claim 1 further comprising a second low-bandwidth memory device, and
wherein the second low-bandwidth memory device includes one or more access channels, and
the memory interleave operation is performed among the plurality of access channels of the high-bandwidth memory device, the at least one of one or more access channels of the first low-bandwidth memory device, and at least one of the one or more access channels of the second low-bandwidth memory device.

6. The SoC of claim 1:
wherein the high-bandwidth memory device comprises a Wide I/O memory device; and
wherein the low-bandwidth memory device comprises a Low-Power DDR (LPDDR) memory device.

7. The SoC of claim 6, wherein, during a low-power mode of operation of the SoC, the interleaving unit performs the memory interleave operation among the plurality of access channels of the Wide I/O memory device.

8. The SoC of claim 7, wherein, during a high-power mode of operation of the SoC, the interleaving unit performs the memory interleave operation among the plurality of access channels of the Wide I/O memory device and the at least one of the one or more access channels of the LPDDR memory device.

9. The SoC of claim 1, wherein a bandwidth of the high-bandwidth memory device is evenly divided by the number of access channels of the high-bandwidth memory device, and the high-bandwidth memory device performs data communication via each access channel with the evenly divided bandwidth.

10. The SoC of claim 9, wherein a bandwidth of the low-bandwidth memory device is evenly divided by the number of access channels of the low-bandwidth memory device, and when the evenly divided bandwidth of the low-bandwidth memory device is less than the evenly divided bandwidth of the high-bandwidth memory device, the interleaving unit performs a portion of a memory access command using at least two access channels of the low-bandwidth memory device.

11. The SoC of claim 1, wherein the high-bandwidth memory device is fabricated on a first chip,
an application processor including the interleaving unit is fabricated on a second chip, and
the first chip and the second chip are connected to one another using a through-silicon via connection arrangement.

12. The SoC of claim 11:
wherein the first chip and second chip are mounted to a first printed circuit board and packaged collectively in a first chip package, the low-bandwidth memory device is fabricated on a third chip mounted to a second printed circuit board,
the third chip is connected to the second printed circuit board by a wiring arrangement,
the third chip and the second printed circuit board are packaged collectively in a second package; and the first chip package and the second chip package are connected to each other by a wiring arrangement.

13. A system on chip (SoC) comprising:
a memory controller;
a high-bandwidth memory device in communication with the memory controller, the high-bandwidth memory device having a plurality of access channels, the high-bandwidth memory device comprising a Wide I/O type memory device;
a low-bandwidth memory device in communication with the memory controller, the low-bandwidth memory device having one or more access channels, the low-bandwidth device comprising a Low-Power DDR type memory device, the high-bandwidth memory device having a higher operation bandwidth than the first low-bandwidth memory device; and
an interleaving unit configured to perform a memory interleave operation among the plurality of access channels of the high-bandwidth memory device and at least one of the one or more access channels of the low-bandwidth memory device,
wherein, during a low-power mode of operation of the SoC, the interleaving unit performs the memory interleave operation among only the plurality of access channels of the high-bandwidth memory device,
wherein the interleaving unit comprises a router configured to receive a request for a channel interleaving and configured to designate one of access to a high-bandwidth region and a low-bandwidth region,
wherein, when the router designates access to the high-bandwidth region, the plurality of access channels of the high-bandwidth memory device are selected, when the router designates access to the low-bandwidth region, the one or more access channels of the low-bandwidth channel interleaver are selected, and, when the router extends the high-bandwidth region, the router extends the high-bandwidth region to include a path to the at least one access channel of the low-bandwidth memory device.

14. The SoC of claim 13 further comprising:
a first chip on which the memory controller is fabricated; and
at least one second chip on which the high-bandwidth memory device is fabricated,
wherein the at least one second chip is stacked on the first chip.

15. The SoC of claim 14, wherein the at least one second chip comprises a plurality of second chips, each of the plurality of second chips including one or more Wide I/O type memory devices.

16. A channel interleaving unit for a system on chip (SoC) comprising:
- a high-bandwidth channel interleaver in communication with a high-bandwidth memory device and a first low-bandwidth memory device and configured to perform a memory interleave operation among a plurality of access channels of the high-bandwidth memory device and a memory interleave operation among the plurality of access channels of the high-bandwidth memory device and at least one of one or more access channels of the low-bandwidth memory device;
- a low-bandwidth channel interleaver configured to perform the memory interleave operation among at least one access channel of the low-bandwidth memory device; and
    - a router configured to receive memory access commands and determine whether each of the memory access commands is transmitted to the high-bandwidth channel interleaver or to the low-bandwidth channel interleaver based on an address of each of the memory access commands, the router configured to designate one of access to a high-bandwidth region and a low-bandwidth region,
    - wherein, when the router designates access to the high-bandwidth region, the high-bandwidth channel interleaver is selected, when the router designates access to the low-bandwidth region, the low-bandwidth channel interleaver is selected, and, when the router extends the high-bandwidth region, the router extends the high-bandwidth region to include a path to the at least one access channel of the low-bandwidth memory device.

17. The channel interleaving unit of claim 16 further comprising a multiplexer configured to perform an arbitration among the memory access commands.

18. The channel interleaving unit of claim 17, wherein the multiplexer performs the arbitration based on priority information.

19. The channel interleaving unit of claim 18, wherein the priority information includes priority information of each of the memory access commands and status information of the channel interleaving unit, the status information including urgent information of the high-bandwidth channel interleaver, urgent information of the low-bandwidth channel interleaver and urgent information of the router, the urgent information being generated based on status of a buffer for storing the memory access commands.

20. A mobile device comprising:
- a system on chip (SoC) comprising:
    - a high-bandwidth memory device having a plurality of access channels;
    - a low-bandwidth memory device having one or more access channels, the high-bandwidth memory device having a higher operation bandwidth than the first low-bandwidth memory device; and
    - an interleaving unit configured to perform a memory interleave operation among the plurality of access channels of the high-bandwidth memory device and at least one of the one or more access channels of the low-bandwidth memory device, wherein the interleaving unit comprises:
        - a high-bandwidth channel interleaver in communication with the high-bandwidth memory device and the first low-bandwidth memory device and configured to manage a memory interleave operation among the plurality of access channels of the high-bandwidth memory device and configured to manage the memory interleave operation among the plurality of access channels of the high-bandwidth memory device and the at least one of the one or more access channels of the first low-bandwidth memory device,
        - a low-bandwidth channel interleaver configured to manage the memory interleave operation among the remaining access channels of the first low-bandwidth memory device other than the at least one access channel of the first low-bandwidth memory device managed by the high-bandwidth channel interleaver, and
        - a router configured to receive a request for a channel interleaving and configured to designate one of access to a high-bandwidth region and a low-bandwidth region,
        - wherein, when the router designates access to the high-bandwidth region, the high-bandwidth channel interleaver is selected, when the router designates access to the low-bandwidth region, the low-bandwidth channel interleaver is selected, and, when the router extends the high-bandwidth region, the router extends the high-bandwidth region to include a path to the at least one access channel of the low-bandwidth memory device;
- an input device at which a user provides user input to the SoC; and
- a display configured to provide information output by the SoC.

* * * * *